(12) United States Patent
Aksyuk et al.

(10) Patent No.: US 7,580,175 B2
(45) Date of Patent: Aug. 25, 2009

(54) DETECTOR OF INFRARED RADIATION HAVING A BI-MATERIAL TRANSDUCER

(75) Inventors: Vladimir Anatolyevich Aksyuk, Westfield, NJ (US); Cristian A. Bolle, Bridgewater, NJ (US); Christopher D. W. Jones, Millington, NJ (US); Flavio Pardo, New Providence, NJ (US); Roland Ryf, Aberdeen, NJ (US); Maria Elina Simon, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 106 days.

(21) Appl. No.: 11/766,414

(22) Filed: Jun. 21, 2007

(65) Prior Publication Data

US 2008/0315099 A1    Dec. 25, 2008

(51) Int. Cl.
G02B 26/00 (2006.01)
G01J 5/00 (2006.01)

(52) U.S. Cl. .................. 359/290; 250/338.1
(58) Field of Classification Search ................. 359/224, 359/290; 250/338.1; 438/72, 96
See application file for complete search history.

(56) References Cited

U.S. PATENT DOCUMENTS

| | | | |
|---|---|---|---|
| 3,384,749 A | 5/1968 | Golay | 250/472.1 |
| 4,306,150 A | 12/1981 | Dietz | 250/332 |
| 5,501,893 A | 3/1996 | Laermer et al. | |
| 5,629,790 A | 5/1997 | Neukermans et al. | |
| 5,739,538 A | 4/1998 | Sakaue et al. | 250/345 |
| 6,080,988 A | 6/2000 | Ishizuya et al. | 250/338.1 |
| 6,201,631 B1 | 3/2001 | Greywall | |
| 6,367,252 B1 | 4/2002 | Hill et al. | 60/528 |
| 6,667,823 B2 | 12/2003 | Greywall | |
| 6,734,597 B1 | 5/2004 | Howell et al. | 310/306 |
| 6,806,991 B1 | 10/2004 | Sarkar et al. | 359/290 |
| 6,850,354 B2 | 2/2005 | Greywall | |
| 6,869,169 B2 | 3/2005 | Cabal et al. | 347/56 |
| 6,876,484 B2 | 4/2005 | Greywall | |
| 6,924,581 B2 | 8/2005 | Greywall | |
| 6,980,339 B2 | 12/2005 | Greywall | |
| 6,995,895 B2 | 2/2006 | Greywall | |
| 7,011,288 B1 | 3/2006 | Slicker et al. | 251/11 |
| 7,099,063 B2 | 8/2006 | Greywall | |

(Continued)

OTHER PUBLICATIONS

"Design and Fabrication of a Novel Bimorph Microoptomechanical Sensor," by Si-Hyung Lim et al., Journal of Microeletromechanical Systems, vol. 14, No. 4, Aug. 2005, pp. 683-690.

(Continued)

*Primary Examiner*—William C Choi

(57) ABSTRACT

A representative embodiment of the invention provides an infrared (IR) detector having a movable plate supported at an offset distance from a substrate by a suspension arm. In response to a temperature difference between the plate and the substrate generated by the incident IR radiation, the suspension arm deforms and changes the offset distance for the plate. In one embodiment, the suspension arm has three rod-shaped bimorph transducers that lie within a plane that is parallel to the substrate. The transducers are also parallel to one another, with the transducer that is attached to an anchor of the suspension arm being located between the two transducers that are attached to the plate.

22 Claims, 19 Drawing Sheets

U.S. PATENT DOCUMENTS

| | | | | |
|---|---|---|---|---|
| 2002/0153486 | A1* | 10/2002 | Ishizuya et al. | 250/338.1 |
| 2003/0089865 | A1 | 5/2003 | Eldridge | 251/11 |
| 2003/0099082 | A1 | 5/2003 | Tuo et al. | 361/290 |
| 2003/0111603 | A1 | 6/2003 | Sone et al. | 250/338.1 |
| 2005/0229710 | A1 | 10/2005 | O'Dowd et al. | 73/718 |
| 2006/0152105 | A1 | 7/2006 | Aksyuk et al. | |
| 2006/0158484 | A1 | 7/2006 | Greywall | 347/56 |
| 2006/0228896 | A1 | 10/2006 | Greywall | |

OTHER PUBLICATIONS

"Infrared Vision Using Uncooled Optomechanical Camera," by A. Majumdar et al., Proceedings of SPIE vol. 3948 (2000), 0277-786X/00, pp. 74-79.

"Self-leveling' Uncooled Microcantilever Thermal Detector," by J.L. Corbeil et al., Applies Physics Letters, vol. 81, No. 7, Aug. 2002, American Institute of Physics, pp. 1306-1308.

"Solid State Optical Thermal Imagers," Matthias Wagner et al., Infrared Technologies and Applications XXXIII, Proc. of PSIE, vol. 6542, 65421P, (2007) 0277-786X/07 , pp. 1-10.

"High Sensitivity Uncooled Microcantilever Infrared Imaging Arrays," by Scott R. Hunter et al., Presented at the SPIE Defense and Security Symposium, Apr. 19, 2006, Infrared Technology and Applications XXXII, vol. 6206, pp. 1-12.

"Uncooled Infrared Imaging Using Bimaterial Microcantilever Arrays," N.V. Lavrik et al., Infrared Technology and Applications XXXII, Proc. of SPIE vol. 6206, 62061K, (2006) 0277-786/06, pp. 1-8.

"Optically Readable Bi-material Infrared Detector," by Tohru Ishizuya et al., Infrared Technology and Applications XXVII, Proceedings of SPIE vol. 4369 (2001), pp. 342-349.

"Uncooled MEMS IR Imagers with Optical Readout and Image Processing," Nickolay Lavrik et al., Infrared Technology and Applications XXXIII, Proc. of SPIE vol. 6542, 65421E, (2007), (8 pages).

"High Sensitivity Photomechanical MW-LWIR Imaging using an Uncooled MEMS Microcantilever Array and Optical Readout," by J. Zhao, Infrared Technology and Applications XXXI, Proc. of SPIE vol. 5783, 2005, pp. 506-513.

"High Frame Rate Imaging Using Uncooled Optical Readout Photomechanical IR Sensor," by Jack P. Salerno, Infrared Technology and Applications XXXIII, Proc. of SPIE vol. 6542, 65421D, (2007), (9 pages).

"160 X 120 Pixels Optically Readable Bimaterial Infrared Detector," by Tohru Ishizuya et al., Nikon Corporation, Photonics Technology Department, Core Technology Center, IEEE, 0-7803-71 85-2/02, 2002, pp. 578-581.

"Optomechanical Uncooled Infrared Imaging System: Design, Microfabrication, and Performance," by Yang Zhao et al., Journal of Microelectromechanical Systems, vol. 11, No. 2, Apr. 2002, pp. 136-146.

U.S. Appl. No. 11/531,011, filed Sep. 12, 2006.

U.S. Appl. No. 11/766,430, filed Jun. 21, 2007.

U.S. Appl. No. 12/180,866, filed Jul. 28, 2008.

"High Sensitivity Uncooled Microcantilever Infrared Imaging Arrays," by Scott R. Hunter et al., Infrared Technology and Applications XXIX, Bjørn F. Andresen, Gabor F. Fulop, Editors, Proceedings of SPIE vol. 5074, 2003, pp. 469-480.

"Optomechanical Uncooled Infrared Imaging System," by Yang Zhao, Dissertation, University of California, Berkeley, Fall 2002, pp. 1-155.

U.S. Appl. No. 11/713,207, filed Mar. 2, 2007.

* cited by examiner

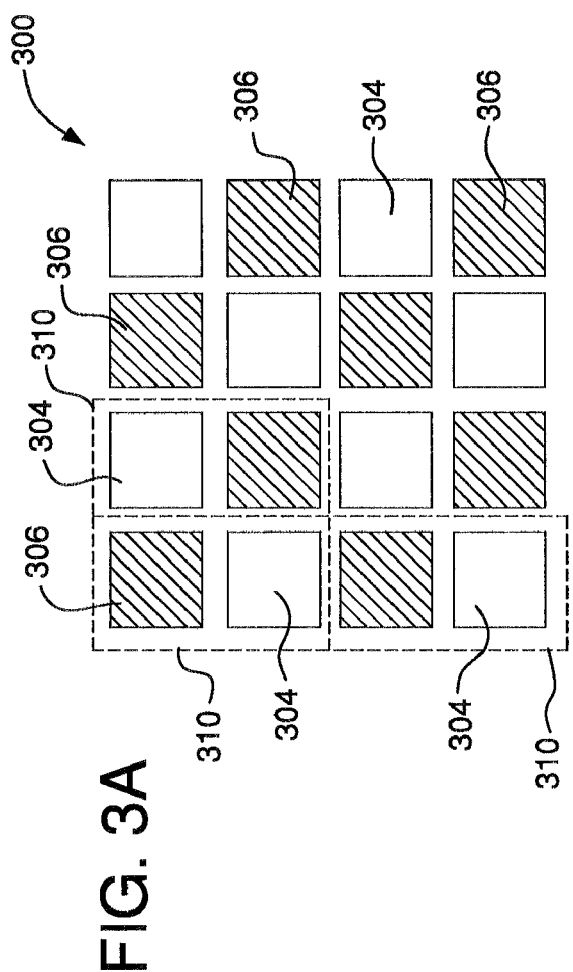
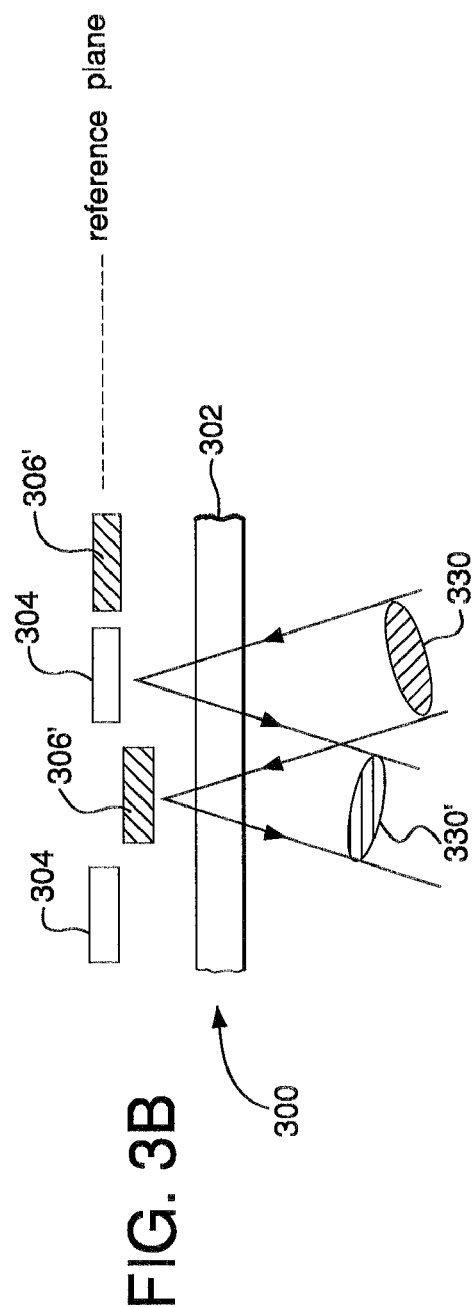
FIG. 3A
FIG. 3B

DETECTOR OF INFRARED RADIATION HAVING A BI-MATERIAL TRANSDUCER

CROSS-REFERENCE TO RELATED APPLICATIONS

The subject matter of this application is related to that of U.S. patent application Ser. No. 11/766,430, entitled "Infrared Imaging Apparatus" by Vladimir Aksyuk, Cristian Bolle, Christopher Jones, Flavio Pardo, Roland Ryf, and Maria Elina Simon, which is being filed on the same date as the present U.S. patent application.

This application is also related to U.S. patent application Ser. No. 11/713,207, filed Mar. 2, 2007, and entitled "Direct Optical Image Projectors." The two above-identified U.S. Patent Applications are incorporated herein by reference in their entirety.

BACKGROUND OF THE INVENTION

1. Field of the Invention

The present invention relates to detectors of infrared radiation and infrared imaging systems.

2. Description of the Related Art

Infrared (IR) detectors are classified into two categories: photonic and thermal. In a photonic IR detector, infrared photons are absorbed to excite electronic transitions and/or generate photocurrent within an IR absorber, usually a semiconductor material having an appropriate bandgap. The excitation changes material properties of the IR absorber such as, for example, electrical conductivity. This change is measured to quantify the amount of absorbed IR radiation. Photonic IR detectors usually operate at very low temperatures, e.g., about 78 K, to suppress thermally induced electronic transitions and/or thermal "dark" current in the IR absorber. As such, photonic IR detectors utilize cryostats and/or complex cooling systems, which make these detectors heavy, bulky, and relatively expensive.

In a thermal IR detector, the energy of absorbed infrared photons is converted into heat, which causes a temperature increase within the detector. This temperature increase is converted into a mechanical or electrical response, which is measured to quantify the amount of absorbed IR radiation. A sensor employed in a thermal IR detector typically has (i) a resistive bolometer, whose electrical resistance changes with temperature, (ii) a pyroelectric material, which exhibits a spontaneous electric polarization change with temperature, (iii) a thermocouple, whose voltage depends on the thermocouple's temperature differential, and/or (iv) a bi-material (also referred to as bimorph) cantilever, whose shape is sensitive to temperature changes.

Unlike photonic IR detectors, thermal IR detectors typically (i) do not use cooling and (ii) can operate at temperatures normally present in the environment, e.g., about 300 K. As a result, thermal IR detectors can be light, compact, and relatively inexpensive. Accordingly, thermal IR detectors and infrared imaging systems employing those detectors are being actively developed.

SUMMARY OF THE INVENTION

A representative embodiment of the invention provides an infrared (IR) detector having a movable plate supported at an offset distance from a substrate by a suspension arm. In response to a temperature difference between the plate and the substrate generated by the incident IR radiation, the suspension arm deforms and changes the offset distance for the plate. In one embodiment, the suspension arm has three rod-shaped bimorph transducers that lie within a plane that is parallel to the substrate. The transducers are also parallel to one another, with the transducer that is attached to an anchor of the suspension arm being located between the two transducers that are attached to the plate. Advantageously, this transducer arrangement in a suspension arm compensates the adverse effects of ambient temperature variations, creates a well-balanced plate with just one suspension arm, and enables an array of IR detectors to have a relatively large IR fill factor.

According to one embodiment, a device of the present invention has: (A) a substrate; (B) a first plate; and (C) a first suspension arm that supports the first plate at an offset distance from the substrate. The first suspension arm has: (i) an anchor attached to the substrate; and (ii) first, second, and third rods. Each of the first, second, and third rods is a bimorph transducer. A first end of the first rod is attached to the anchor. A first end of the second rod is attached to the first plate. A first end of the third rod is attached to the first plate. Second ends of the first, second, and third rods are connected to one another by a thermal isolator. In response to a temperature difference between the first rod and at least one of the second and third rods, the first suspension arm is adapted to deform and change the offset distance for the first plate.

According to another embodiment, a device of the present invention has: (A) a substrate; (B) a first plate; (C) a first suspension arm that supports the first plate at an offset distance from the substrate; and (D) a second plate supported at a respective offset distance from the substrate. Each of the first and second plates has a respective reflector mounted on the plate. The first suspension arm comprises: (i) an anchor attached to the substrate; and (ii) two or more rods. Each of the two or more rods is a bimorph transducer. A first end of a first rod is attached to the anchor. A first end of a second rod is attached to the first plate. Second ends of the first and second rods are connected to one another by a thermal isolator. In response to a temperature difference between the first and second rods, the first suspension arm is adapted to deform and change the offset distance for the first plate.

BRIEF DESCRIPTION OF THE DRAWINGS

Other aspects, features, and benefits of the present invention will become more fully apparent from the following detailed description, the appended claims, and the accompanying drawings in which:

FIGS. 3A-B show top and side views, respectively, of an IR detector array according to one embodiment of the invention;

DETAILED DESCRIPTION

The operating principles of an infrared (IR) detector having a bi-material cantilever is described, e.g., in an article by S. R. Hunter, R. A. Amantea, L. A. Goodman, et al., entitled "High Sensitivity Uncooled Microcantilever Infrared Imaging Arrays," published in Proceedings of SPIE, 2003, v. 5074, pp. 469-480, the teachings of which are incorporated herein by reference. Briefly, the detector typically has (1) an IR-radiation absorbing area, (2) a bi-material element, and (3) a thermal isolator. The IR-radiation absorbing area converts the impinging IR radiation into heat, while the thermal isolator prevents the heat from being shunted to the substrate. The two materials forming the bi-material element are selected to have a large difference in their thermal-expansion coefficients. As the temperature of the bi-material element increases due to the IR heating, the material having the larger thermal-expansion coefficient attempts to expand a greater amount than the adjacent material having the smaller thermal-expansion coefficient. Because the two materials are formed so that they adhere to one another in the bi-material element, they are forced to expand by equal amounts, causing a tensile stress to build up in one material and a compressive stress to build up in the other. The resulting stress gradient across the bi-material element bends it, thereby causing the bi-material element to move with respect to the substrate. The resulting mechanical displacement of a selected portion of the bi-material element or of a structure attached to the bi-material element can be measured and used to quantify the amount of absorbed IR radiation.

Representative pairs of materials that can be used to form a bi-material element include, but are not limited to, a low thermal-expansion material, such as silicon oxide whose composition can be expressed as $SiO_x$ (having a thermal-expansion coefficient "tec" of about 0.5 ppm/K), silicon nitride whose composition can be expressed as $SiN_x$ (tec ~1 ppm/K), and silicon carbide whose composition can be expressed as $SiC_x$ (tec ~4 ppm/K), silicon (tec ~2.5 ppm/K), and a high thermal expansion material, such as gold (tec ~14.2 ppm/K), nickel (tec ~13.4 ppm/K), silver (tec ~18.9 ppm/K), aluminum (tec ~23 ppm/K). To maximize the mechanical displacement, it is preferred to have a relatively large thermal-expansion coefficient differential between the two materials. One skilled in the art will appreciate that the Young's modulus of the materials also affects the amount of displacement.

Figure 1:
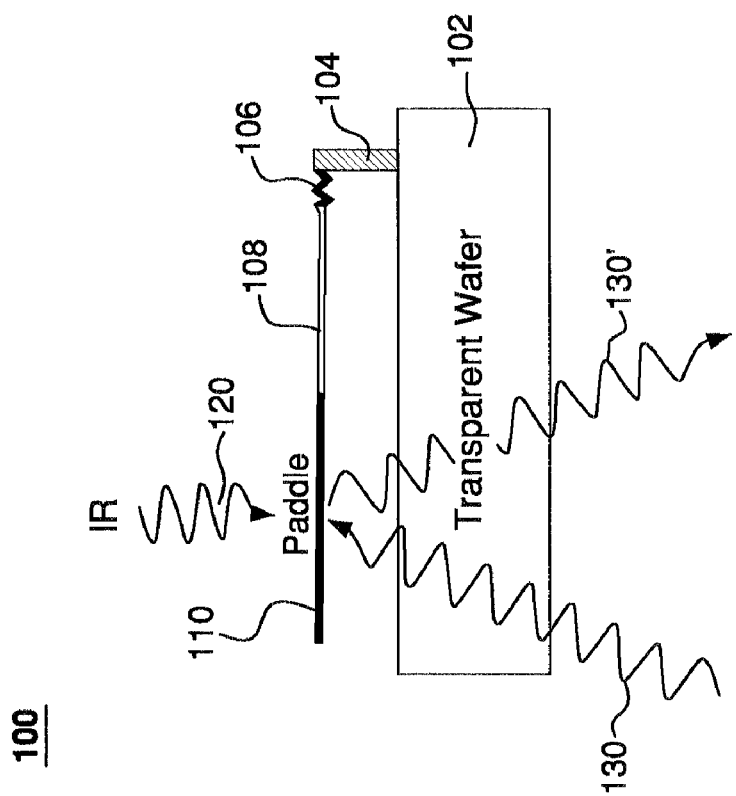
FIG. 1 illustrates a method of optically interrogating an IR detector according to one embodiment of the invention.

FIG. 1 illustrates a method of optically interrogating an IR detector 100 according to one embodiment of the invention. More specifically, FIG. 1 shows a cross-sectional side view of detector 100 together with two optical beams, an IR beam 120, the intensity of which is being detected, and an interrogating (e.g., visible) beam 130. In a typical implementation, detector 100 is a MEMS device.

Detector 100 has a substrate 102 that is substantially transparent to interrogating beam 130. A plate 110 is movably mounted on substrate 102 using an anchor (support post) 104, a thermal isolator 106, and a bi-material transducer 108. Plate 110 has a reflective layer that reflects interrogating beam 130 as well as an IR-absorbing layer that absorbs IR beam 120 and converts its energy into heat. These two layers can be separate and distinct from each other, or a single layer in the plate structure can perform the functions of both layers either with or without utilizing the mechanical layer to perform these functions. The absorbed IR energy increases the temperature of the plate and, due to good thermal contact between the plate and bi-material transducer 108, the temperature of the bi-material transducer as well. Isolator 106 has relatively low thermal conductivity and, as such, prevents the heat from sinking, through anchor 104, into substrate 102. The IR-induced temperature increase in plate 110 and bi-material transducer 108 causes a stress gradient to build across the bi-material transducer, which bends the bi-material transducer and moves the plate with respect to substrate 102. The motion direction depends on the bi-material layer arrangement in transducer 108 and can be toward substrate 102 or away from the substrate. The motion and/or displacement of plate 110 imparts a phase shift onto reflected beam 130', which phase shift is detected and used to quantify the intensity of IR beam 120.

Figure 2:
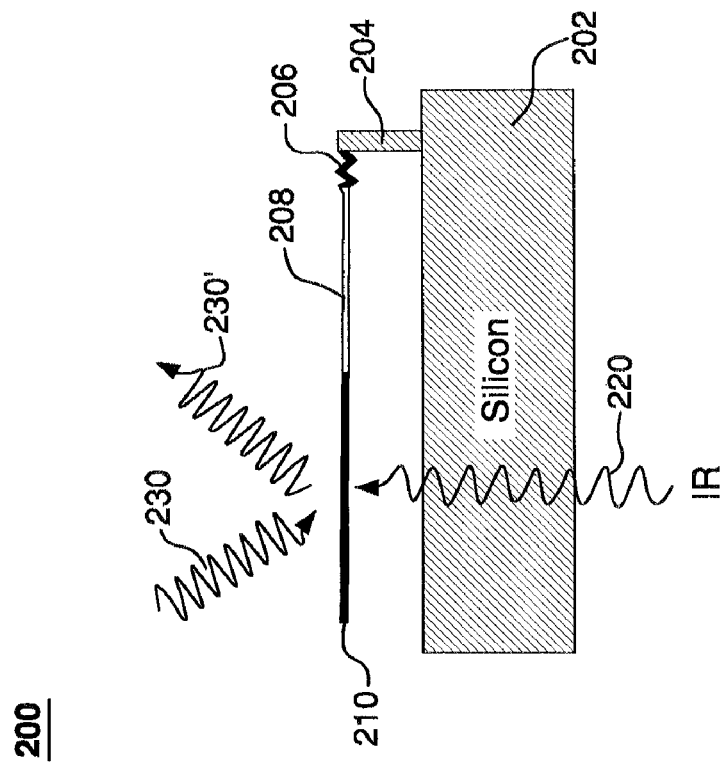
FIG. 2 illustrates a method of optically interrogating an IR detector according to another embodiment of the invention.

FIG. 2 illustrates a method of optically interrogating an IR detector 200 according to another embodiment of the invention. Detector 200 is generally similar to detector 100 (FIG. 1), and analogous elements of the two detectors are designated with labels having the same last two digits. One difference between detectors 100 and 200 is that, in the latter, IR beam 220, the intensity of which is being detected, is directed toward the underside of plate 210 through (e.g., silicon) substrate 202 that is substantially transparent to the IR light. A temperature increase caused by the absorption of beam 220 causes bi-material transducer 208 to bend and move plate 210 with respect to substrate 202. The motion and/or displacement of plate 210 imparts a phase shift onto reflected beam 230', which phase shift is detected and used to quantify the intensity of IR beam 220.

FIGS. 3A-B show top and side views, respectively, of an IR detector array 300 according to one embodiment of the invention. Array 300 is a MEMS device that has a plurality of pixels 310, each having two IR detectors, a detector 304 and a detector 306. One skilled in the art will appreciate that, the pixel arrangement shown in FIG. 3 is exemplary and that other pixel arrangements and pixel/detector shapes can also be used without departing from the principles of the invention. In one embodiment, each detector 306 is an IR detector that is generally analogous to detector 100 of FIG. 1, and each detector 304 has a fixed plate that does not move with respect to substrate 302. In another embodiment, each of detectors 304 and 306 is analogous to detector 100, with one difference between detectors 304 and 306 being that, in response to IR-induced heating, their plates move in opposite directions. For example, the plates in detectors 304 are adapted to move away from substrate 302, while the plates in detectors 306 are adapted to move toward the substrate.

If an IR image is projected onto array 300, then the intensity distribution within the image is converted into plate displacements with respect to their respective reference positions. Generally, the greater the IR intensity received by a detector, the greater the plate displacement in that detector. FIG. 3B illustrates a response of array 300 to an exemplary IR image projected onto the array, wherein the IR image has a single bright spot. Consequently, the plate of only one detector (i.e., detector 306' which receives the bright spot) is displaced from the reference plane level, while the plates of all other detectors remain substantially unperturbed. If array 300 having the plate-displacement pattern shown in FIG. 3B is interrogated by a planar-wave visible beam 330, then a reflected beam 330' will no longer be a planar wave, but rather, it will have a phase-front distortion introduced by the plate displacement in detector 306'. In general, an arbitrary IR image projected onto array 300 will cause the array to act as a spatial phase modulator that imprints onto interrogating visible beam 330 a spatial phase modulation pattern corresponding to the IR image.

A method and system for converting a spatial phase modulation pattern into a viewable visible image is described, e.g., in the above-cited U.S. patent application Ser. No. 11/713,207. The reader is therefore referred to the '207 application for a detailed description of that method/system. For the sake of convenience, a brief description of a representative optical arrangement that can be used to implement an embodiment of the conversion method disclosed in the '207 application is given below.

Figure 4:
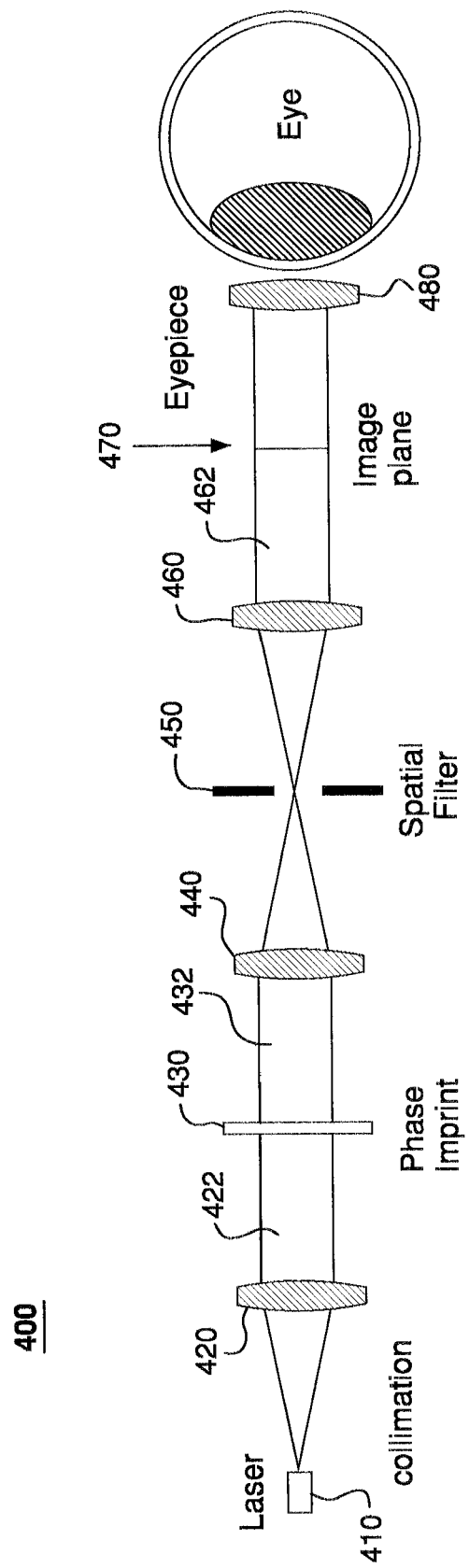
FIG. 4 shows a representative optical arrangement for converting a phase modulation pattern into a viewable visible image.

FIG. 4 shows an optical arrangement 400 for converting a spatial phase modulation pattern into a viewable visible image. Arrangement 400 has a spatial phase modulator 430 that imprints a spatial phase modulation pattern onto a planar-wave beam 422 that is produced using a laser 410 and a collimating lens 420. The resulting spatially phase-modulated beam 432 passes through a lens 440 that forms at its focal plane an intensity pattern, wherein the spatial phase modulation pattern of beam 432 and the formed intensity pattern are related by spatial Fourier transformation.

Figure 5A:
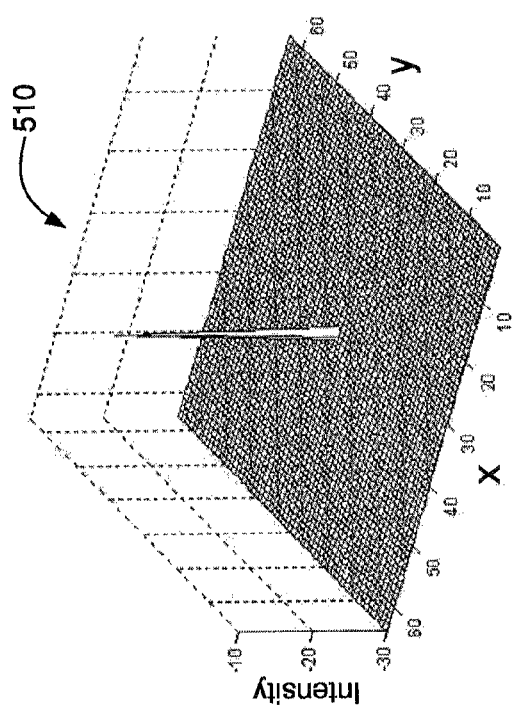
FIGS. 5A-B show two representative intensity patterns formed at a focal plane of a lens in the optical arrangement of FIG. 4.
Figure 5B:
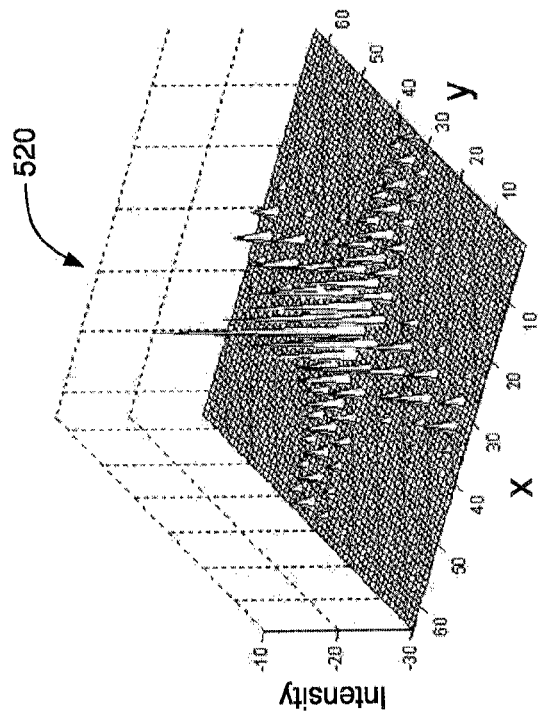

FIGS. 5A-B show two representative intensity patterns formed at the focal plane of lens 440. More specifically, axes x and y in each of FIGS. 5A-B represent the coordinates within the focal plane of lens 440, and the axis orthogonal to the xy plane represents light intensity. FIG. 5A shows an intensity pattern 510 that is produced when beam 432 is a planar wave, thus corresponding to a situation when all plates are parallel to the substrate and positioned at the same offset distance. Pattern 510 has a single peak, generally referred to as a zero-order peak. FIG. 5B shows an intensity pattern 520 that is produced when beam 432 has a periodic phase-modulation pattern produced when spatial phase modulator 430 is illuminated by a uniform IR beam. As evident in FIG. 5B, pattern 520 has multiple peaks in addition to the zero-order peak. These additional peaks are generally referred to as side peaks.

Referring back to FIG. 4, a spatial filter 450 placed at a focal plane of lens 440 has one or more openings configured to transmit light corresponding to the respective areas around one or more selected side peaks. At the same time, spatial filter 450 rejects (blocks) light corresponding to the zero-order peak and the remaining side peaks. The resulting spatially filtered beam is collimated by a lens 460 to produce a collimated beam 462. If spatial phase modulator 430 is not illuminated uniformly by IR light, then the effect is to broaden the side peaks. As explained in more detail in the '207 application, beam 462 is an intensity-modulated beam having a spatial intensity distribution related to the phase modulation pattern of beam 432. At an image plane 470, this spatial intensity distribution creates a visible image that can be viewed as known in the art, e.g., using an eyepiece 480.

Figure 6:
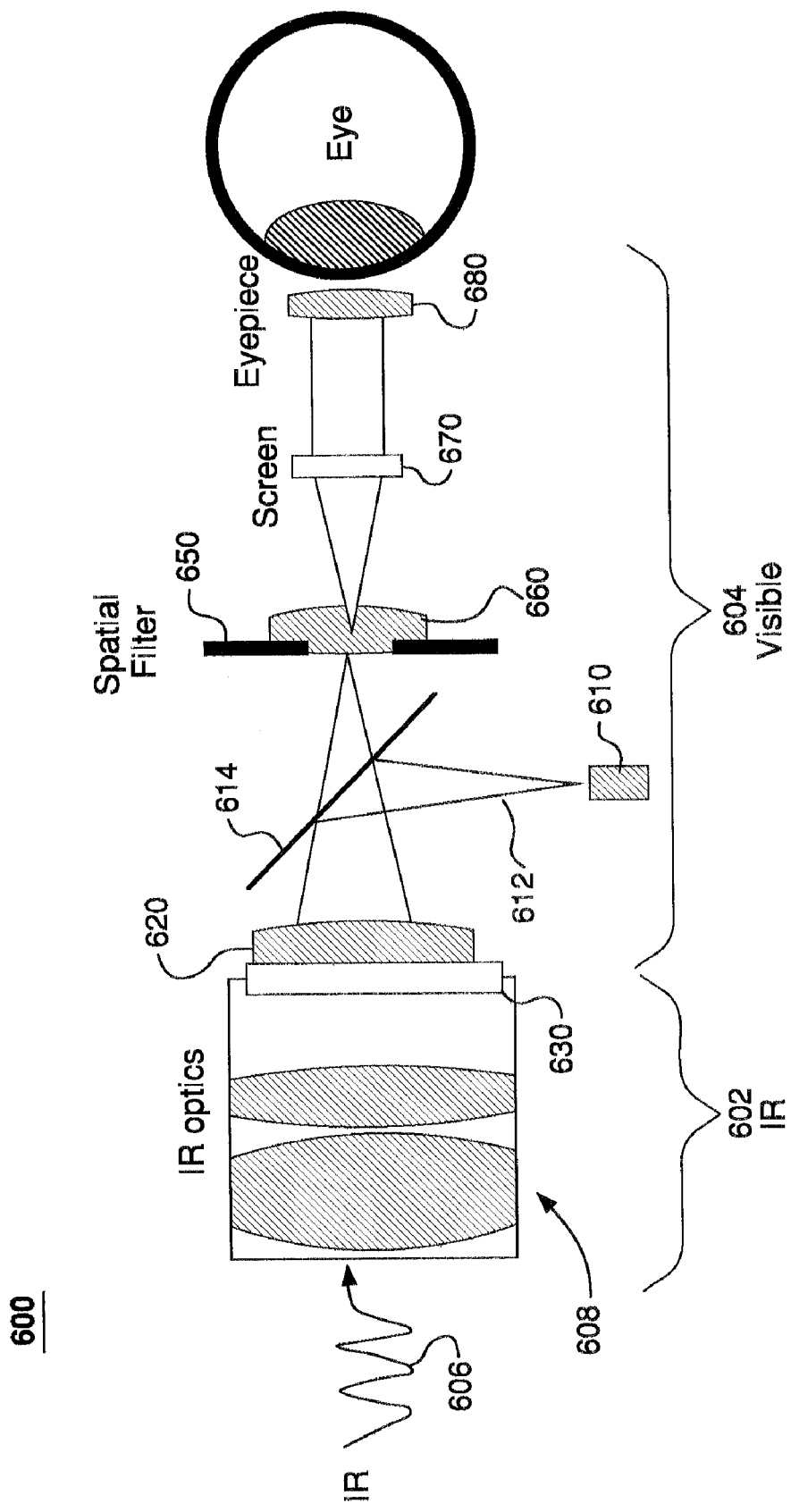
FIG. 6 shows an IR imaging system according to one embodiment of the invention.

FIG. 6 shows an IR imaging system 600 according to one embodiment of the invention. System 600 has an IR detector array 630 that is analogous to IR detector array 300 of FIG. 3. In one embodiment, array 630 has 1024×1024 pixels, each analogous to pixel 310 of array 300 (FIG. 3).

Array 630 divides system 600 into two optical sections, an IR section 602 and a visible section 604. Section 602 has an IR lens assembly 608 that receives an IR beam 606 from an object (not shown in FIG. 6) and projects a corresponding image of the object onto array 630. Pixels of array 630 transform the received IR radiation into plate displacements as described above.

Section 604 is designed to optically interrogate array 630 to transform plate displacements into a corresponding visible image in a manner generally analogous to that of optical arrangement 400 of FIG. 4. However, optical arrangement 400 differs from section 604 of system 600 in that the latter utilizes a so-called folded optical configuration, in which some optical elements are traversed by light more than one time. As a result, section 604 can generally have fewer optical elements and be more compact than optical arrangement 400.

Section 604 has a laser 610 that generates an appropriately polarized visible beam 612 and directs that beam, via an optical beam redirector 614, toward array 630. In one embodiment, optical beam redirector 614 is a polarization beam splitter that is oriented with respect to the polarization of optical beam 612 so as to redirect substantially all light of that beam towards array 630. In this embodiment, section 604 also has a quarter-wave plate (not explicitly shown in FIG. 6). The quarter wave plate is a birefringent plate that is located between polarization beam splitter 614 and array 630. The birefringent plate produces a retardation of about one quarter of a wavelength between two orthogonal linear polarization components of an optical beam transmitted normally therethrough. By traversing the birefringent plate two times, the light directed to and reflected from array 630 acquires a polarization that causes polarization beam splitter 614 to transmit (without redirecting) the reflected light, as opposed to redirecting it back toward laser 610.

A lens 620 located between splitter 614 and array 630 is traversed by the light two times and, as such, performs at least two functions. For the light traveling toward array 630, lens 620 acts as a collimating lens similar to lens 420 (see FIG. 4).

For the light reflected by array 630, lens 620 acts as a focusing lens similar to lens 440 (see FIG. 4).

Plate displacements in array 630 induced by the received IR image imprint a corresponding spatial phase modulation pattern onto the reflected visible beam (see also FIG. 3). Lens 620 forms at its focal plane an intensity pattern corresponding to the spatial phase modulation pattern of the reflected visible beam in a manner similar to that of lens 440 of arrangement 400 (see FIGS. 4 and 5A-B). A spatial filter 650 that is generally analogous to spatial filter 450 (FIG. 4) transmits light corresponding to one or more selected side peaks, while rejecting light corresponding to the zero-order peak and the remaining side peaks. A lens 660 receives the resulting spatially filtered beam and forms a visible image on an optional screen 670, which image can be viewed, e.g., through an eyepiece 680. One skilled in the art will appreciate that the visible image formed on screen 670 is a representation, in visible light, of the IR image projected by the optical assembly of section 602 onto array 630. System 600 therefore advantageously converts an IR image that cannot be observed by a naked human eye into a corresponding visible-light image that is readily observable.

Figure 7:
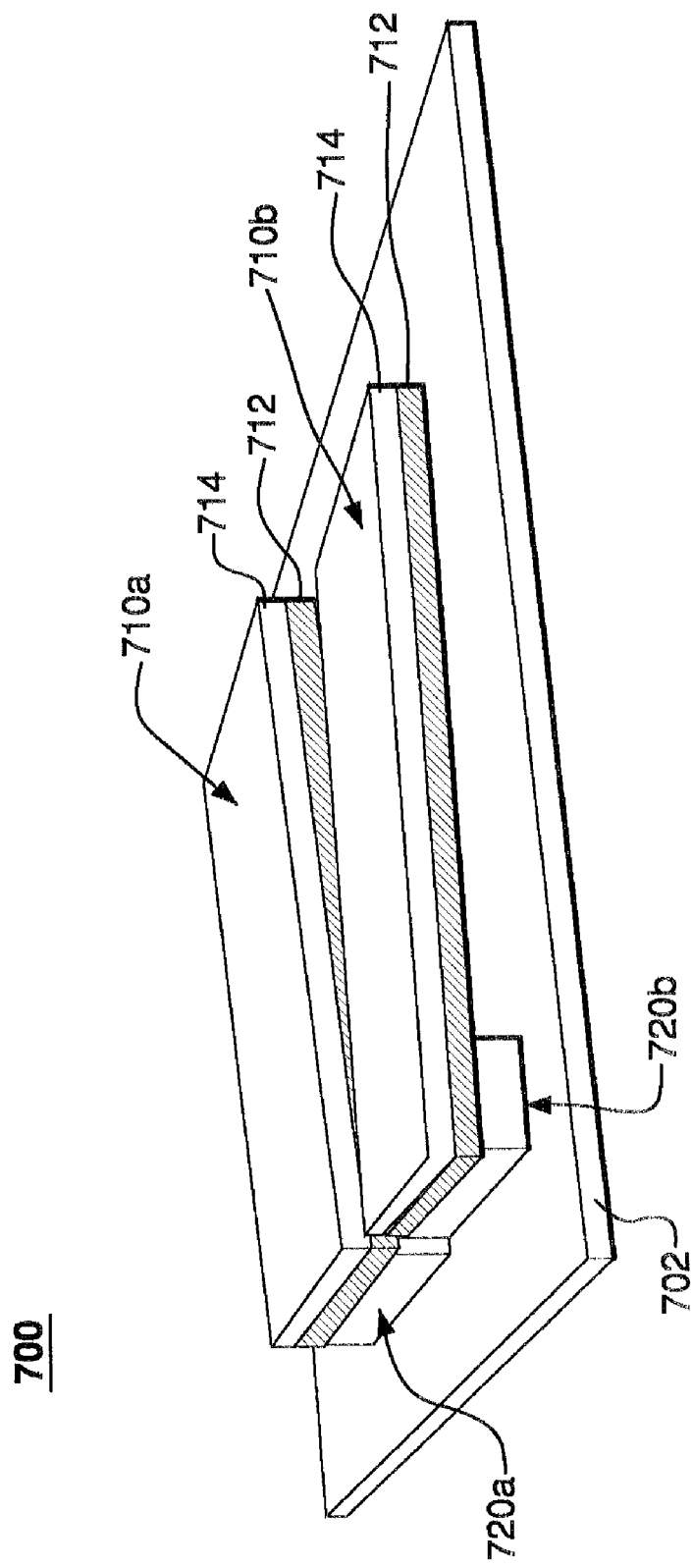
FIG. 7 shows a three-dimensional perspective view of a pixel that can be used in the IR detector array of the system shown in FIG. 6 according to one embodiment of the invention.

FIG. 7 shows a three-dimensional perspective view of a pixel 700 that can be used in array 630 according to one embodiment of the invention. Pixel 700 has two bi-material plates 710a-b mounted on a substrate 702. Each plate 710 has at least two layers, a top (e.g., gold) layer 714 having a relatively large thermal-expansion coefficient and a bottom (e.g., hydrogenated SiC) layer 712 having a relatively small thermal-expansion coefficient. Each plate 710 can also have additional layers (not explicitly shown), e.g., an IR-absorbing layer and a reflective layer for reflecting the interrogating visible light.

Plate 710a is mounted on substrate 702 using a support post 720a that has a large thermal conductance (obtained either through proper geometry or material selection, or both). As such, plate 710a is in substantial thermal equilibrium (has the same temperature as) substrate 702. In contrast, plate 710b is mounted on substrate 702 using a support post 720b that is made to have a low thermal conductance (similarly obtained either through proper geometry or material selection, or both) and, as such, acting as a thermal isolator. As a result, any IR radiation absorbed by plate 710b causes a temperature increase in that plate relative to plate 710a and substrate 702. This temperature increase will generally cause plate 710b to curl and deflect its unattached edge toward substrate 702 as indicated in FIG. 7. Differential displacement of plates 710a-b with respect to one another can be used to imprint a spatial phase modulation pattern onto an interrogating visible beam, which can then be used, e.g., in system 600, to visualize the corresponding IR image projected onto an IR detector array having pixel 700.

Figure 8:
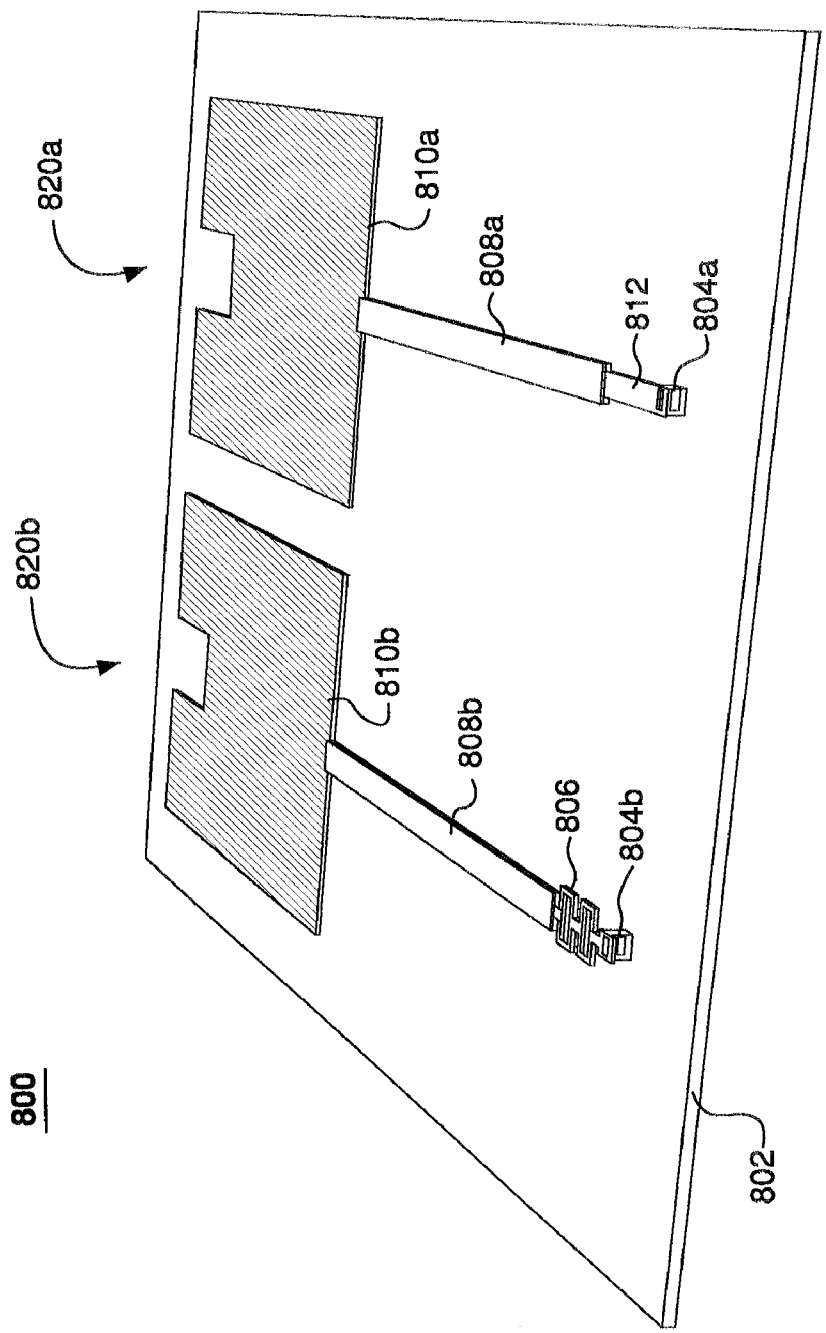
FIG. 8 shows a three-dimensional perspective view of a pixel that can be used in the IR detector array of the system shown in FIG. 6 according to another embodiment of the invention.

FIG. 8 shows a three-dimensional perspective view of a pixel 800 that can be used in array 630 according to another embodiment of the invention. Pixel 800 has an IR detector 820b that is generally similar to detector 100 (FIG. 1) or 200 (FIG. 2). More specifically, detector 820b has a plate 810b that is movably mounted on a substrate 802 using an anchor 804b, a thermal isolator 806, and a bi-material transducer 808b. Anchor 804b is attached to substrate 802. Bi-material transducer 808b has a shape of a flattened rod or a plank that is oriented generally parallel to substrate 802. Isolator 806, which is located between anchor 804b and bi-material transducer 808b, has relatively low thermal conductivity and, as such, prevents the heat generated by IR absorption in plate 810b from sinking, through the bi-material transducer, into the anchor and substrate 802. The IR-induced temperature increase in plate 810b and bi-material transducer 808b causes the transducer to deform and move the plate with respect to substrate 802.

Pixel 800 further has an IR detector 820a that is generally similar to detector 820b, and analogous elements of the two detectors have labels having the same last two digits. However, one difference between detectors 820b and 820a is that the latter has a thermal link 812 instead of thermal isolator 806. Link 812 has relatively large thermal conductivity and keeps plate 810a and bi-material transducer 808a in substantial thermal equilibrium with anchor 804a and substrate 802. Similar to the differential displacement of plates 710a-b in pixel 700, differential displacement of plates 810a-b in pixel 800 can be used to imprint a phase modulation pattern onto an interrogating visible beam.

Figure 9:
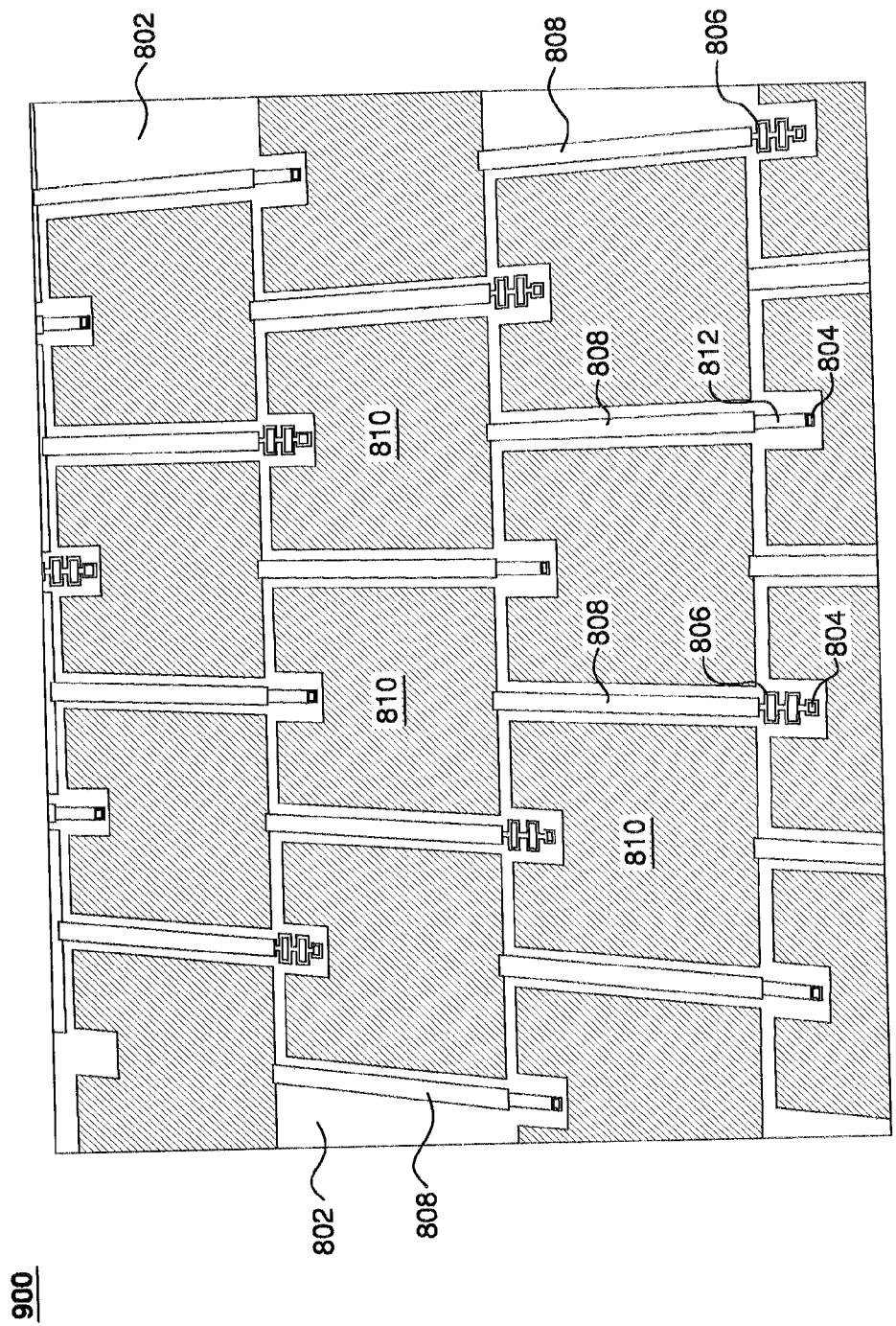
FIG. 9 shows a three-dimensional perspective view of an array that has a plurality of pixels shown in FIG. 8 according to one embodiment of the invention.

FIG. 9 shows a three-dimensional perspective view of an array 900 that has a plurality of pixels 800 according to one embodiment of the invention. In array 900, each support structure for a plate 810 has respective anchor 804, thermal isolator 806 or thermal link 812, and bi-material transducer 808. Each such support structure is fitted into a space created by a corresponding gap between two other plates 810 and a cutout in a third plate 810. As a result, different pixels 800 mesh together to create a two-dimensional array of pixels that are analogous to pixels 310 of FIG. 3.

Figure 10:
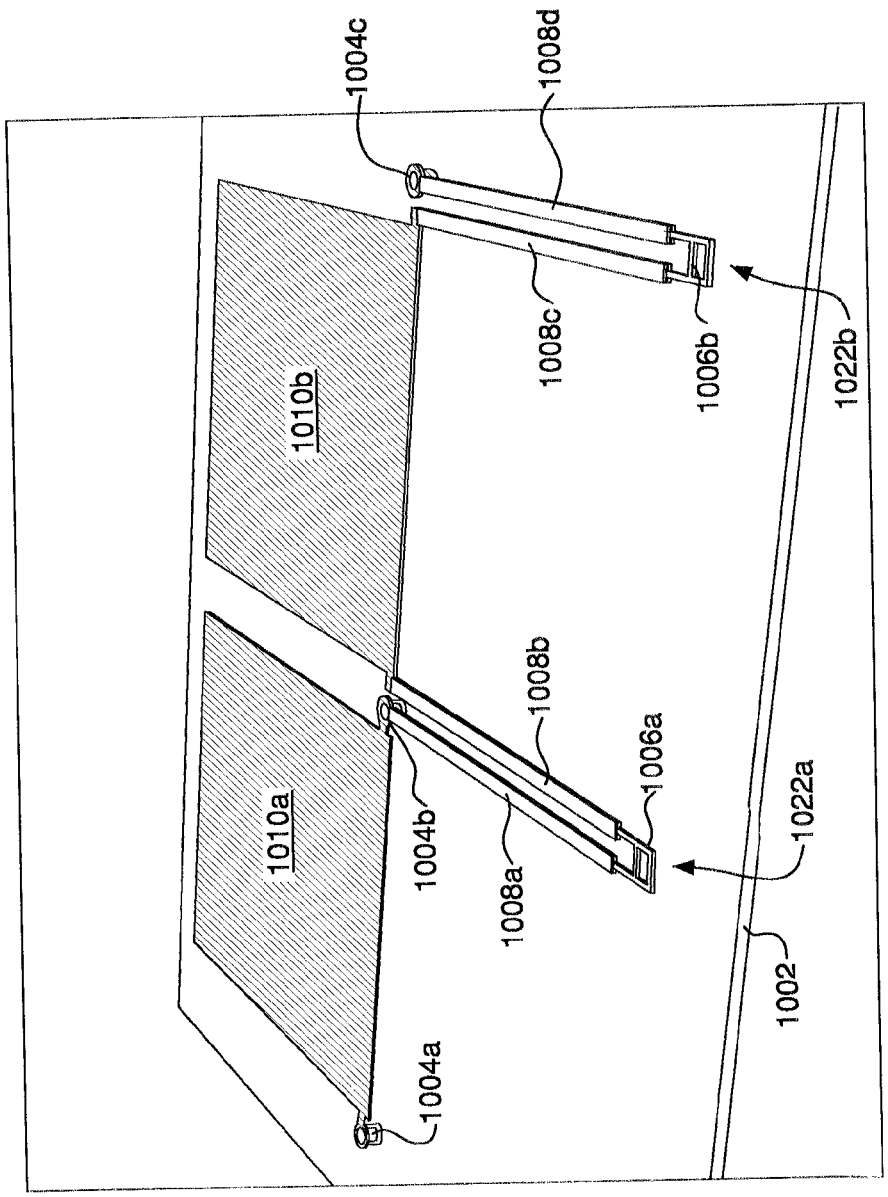
FIG. 10 shows a three-dimensional perspective view of a pixel that can be used in the IR detector array of the system shown in FIG. 6 according to yet another embodiment of the invention.

FIG. 10 shows a three-dimensional perspective view of a pixel 1000 that can be used in array 630 according to yet another embodiment of the invention. Pixel 1000 has two IR absorbing plates: a fixed plate 1010a and a movable plate 1010b. Fixed plate 1010a is fixedly suspended over a substrate 1002 by being attached to anchors 1004a and 1004b. Movable plate 1010b is movably suspended over substrate 1002 using anchors 1004b-c, four bi-material transducers 1008a-d, and two thermal isolators 1006a-b that form two suspension arms 1022a-b for the movable plate.

Each of bi-material transducers 1008a-d is a rod that is oriented substantially parallel to substrate 1002. Two bi-material transducers 1008 belonging to the same suspension arm 1022 are also substantially parallel to one another. One advantageous characteristic of suspension arms 1022 resulting from this transducer arrangement is that the arms can compensate for ambient temperature variations. More specifically, movable plate 1010b does not move with respect to substrate 1002 if there is an ambient temperature change for entire pixel 1000 (i.e., the temperature remains uniform). However, if there is a temperature difference between plate 1010b and substrate 1002, then arms 1022a-b do move plate 1010b from its reference position corresponding to uniform temperature.

First, suppose that pixel 1000 is in thermal equilibrium. Then, four bi-material transducers 1008a-d have the same temperature and, thus, substantially the same shape corresponding to that temperature. Suppose that the temperature is such that transducer 1008a is curled up, i.e., the end of transducer 1008a that is attached to thermal isolator 1006a is at a larger offset distance from substrate 1002 than the end attached to anchor 1004b. Then, transducer 1008b, by virtue of having the same shape as transducer 1008a, will compensate for the curvature of the latter and have its end attached to plate 1010b positioned at the same offset distance from substrate 1002 as the end of transducer 1008a attached to anchor 1004b. Similarly, transducer 1008c will compensate for the curvature of transducer 1008d and have its end attached to plate 1010b positioned at the same offset distance from substrate 1002 as the end of transducer 1008d attached to anchor 1004c. Due to this compensation, plate 1010b will remain in the same (reference) position regardless of ambient temperature variations. Rather, the effect of ambient temperature variations will be motion of isolators 1006a-b up and down with respect to substrate 1002, while plate 1010b remains substantially stationary.

Next, suppose that the temperature of plate 1010b is higher than that of plate 1010a. This temperature differential can result, e.g., from IR absorption and the fact that isolators 1006 inhibit heat dissipation from plate 1010b into the substrate. In this case, bi-material transducers 1008a-b will have different shapes. More specifically, transducer 1008b will have a shape corresponding to the temperature of plate 1010b while transducer 1008a will have a (different) shape corresponding to the temperature of substrate 1002 and plate 1010a. For the same reasons, bi-material transducers 1008c-d will also have different shapes. Due to these shape differences, plate 1010b will become displaced with respect to its reference position corresponding to a thermal equilibrium state of pixel 1000. Similar to the differential displacement of plates 810a-b in pixel 800, differential displacement of plates 1010a-b in pixel 1000 can be used to imprint a spatial phase modulation pattern onto an interrogating visible beam.

Figure 11:
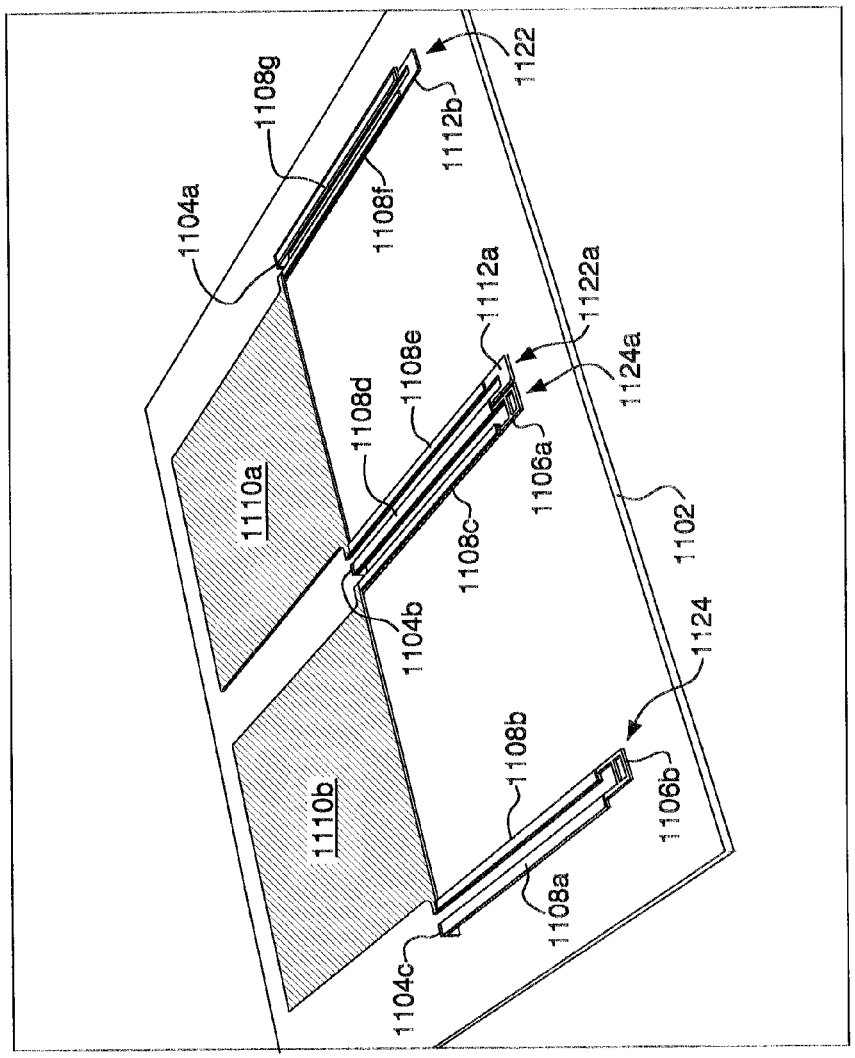
FIG. 11 shows a three-dimensional perspective view of a pixel that can be used in the IR detector array of the system shown in FIG. 6 according to yet another embodiment of the invention.

FIG. 11 shows a three-dimensional perspective view of a pixel 1100 that can be used in array 630 according to yet another embodiment of the invention. Pixel 1100 has two IR absorbing plates 1110a-b. Plate 1110a is suspended over a substrate 1102 using anchors 1104a-b, four bi-material transducers 1108d-g, and two thermal links 1112a-b that together form two suspension arms 1122 for this plate. Plate 1110b is similarly suspended over substrate 1102 using anchors 1104b-c, four bi-material transducers 1108a-d, and two thermal isolators 1106a-b that form two suspension arms 1124. Note that suspension arms 1122a and 1124a share anchor 1104b and transducer 1108d, which advantageously results in surface area savings and a corresponding increase in the fill factor. Similar to suspension arms 1022 of pixel 1000 (FIG. 10), suspension arms 1122 and 1124 of pixel 1100 can compensate for ambient temperature variations. In addition, the substantially identical mechanical structure of the suspension arms 1122 and 1124 enables plates 1110a-b to match each other very well in terms of the residual tilt arising from manufacturing tolerances.

Due to the presence of respective thermal links 1112a-b between transducers 1108d-e and transducers 1108f-g, respectively, plate 1110a is in substantial thermal equilibrium with substrate 1102 and, in that respect, is analogous to fixed plate 1010a of pixel 1000 (see FIG. 10). In contrast, due to the presence of respective thermal isolators 1106a-b between transducers 1108c-d and transducers 1108a-b, respectively, plate 1110b is thermally isolated from substrate 1102 and, similar to plate 1010b (FIG. 10), is susceptible to an IR-induced temperature increase relative to the substrate. This temperature increase will cause a displacement of plate 1110b with respect to its reference position. Similar to the differential displacement of plates 1010a-b in pixel 1000, differential displacement of plates 1110a-b in pixel 1100 can be used to imprint a phase modulation pattern onto an interrogating visible beam.

Figure 12:
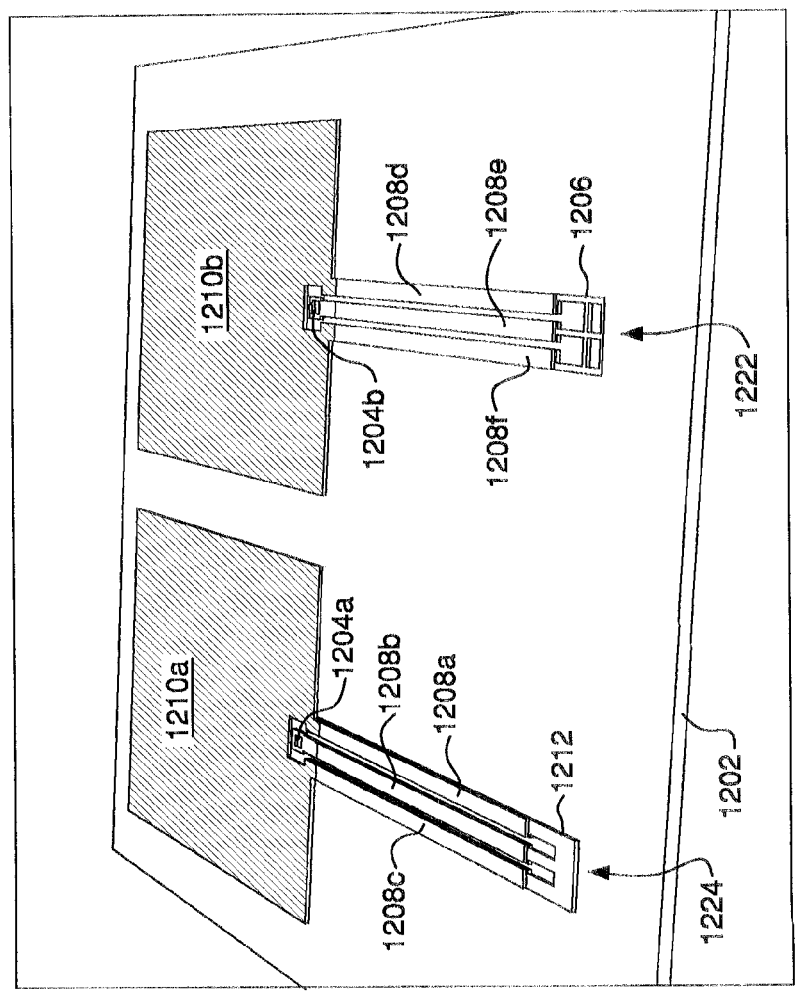
FIG. 12 shows a three-dimensional perspective view of a pixel that can be used in the IR detector array of the system shown in FIG. 6 according to yet another embodiment of the invention.

FIG. 12 shows a three-dimensional perspective view of a pixel 1200 that can be used in array 630 according to yet another embodiment of the invention. Pixel 1200 has two IR-absorbing plates 1210a-b. Plate 1210a is suspended over a substrate 1202 using an anchor 1204a, three bi-material transducers 1208a-c, and a thermal link 1212 that form a suspension arm 1224 for that plate. When undeformed, transducers 1208a-c lie within a plane that is parallel to substrate 1202. Transducers 1208a-c are parallel to one another, with the transducer that is attached to anchor 1204a (i.e., transducer 1208b) located between the two transducers that are directly attached to plate 1210a (i.e., transducers 1208a,c). This transducer arrangement advantageously creates a good balance (in terms of sideway tilting) for plate 1210a with just one suspension arm.

Plate 1210b is similarly suspended over substrate 1202 using an anchor 1204b, three bi-material transducers 1208d-f, and a thermal isolator 1206 that form a suspension arm 1222. Similar to suspension arms 1122 and 1124 of pixel 1100 (FIG. 11), suspension arms 1222 and 1224 of pixel 1200 compensate for ambient temperature variations. In addition, the fact that a single suspension arm is used for each of plates 1210a-b can advantageously be used to achieve a relatively high IR fill factor in an array having a plurality of pixels 1200 because having a single suspension arm per plate saves surface area in the array and enables a corresponding increase in the surface area that can be taken up by the IR-absorbing plates.

Figure 13:
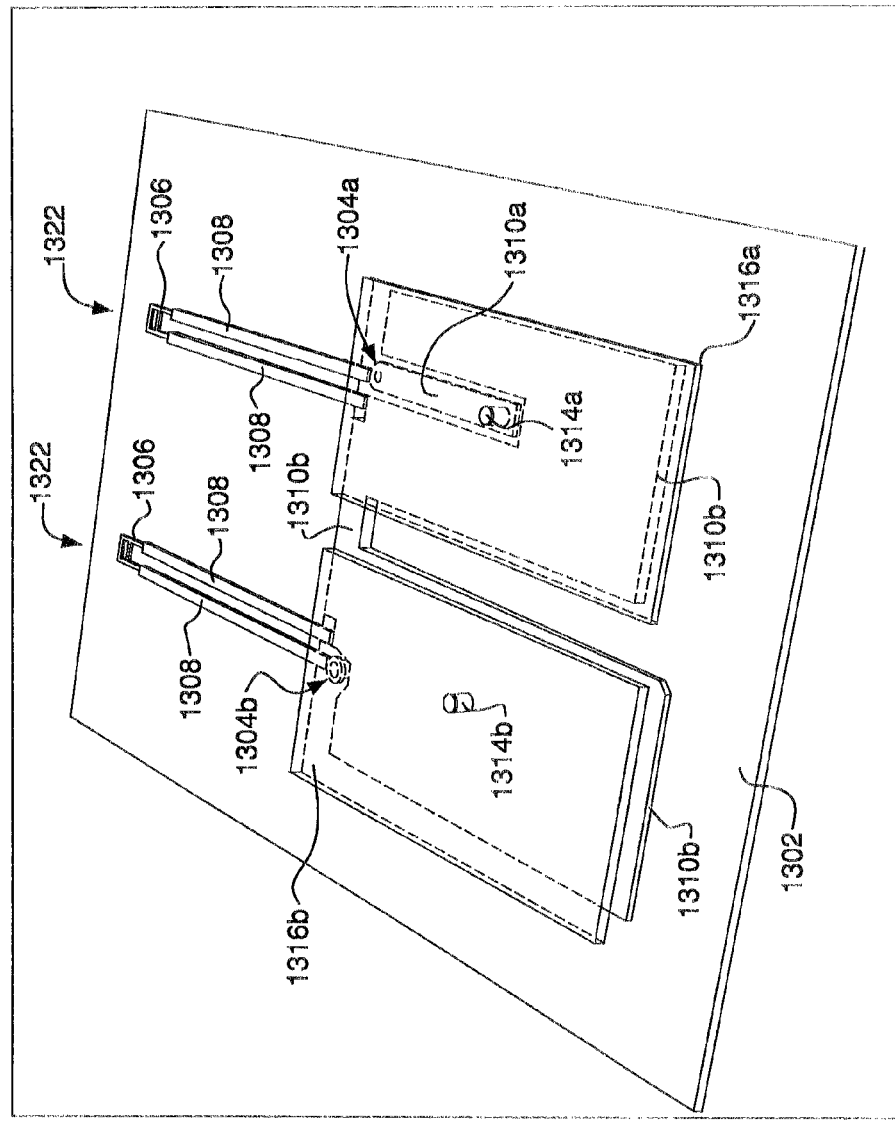
FIG. 13 shows a three-dimensional perspective view of a pixel that can be used in the IR detector array of the system shown in FIG. 6 according to yet another embodiment of the invention.

FIG. 13 shows a three-dimensional perspective view of a pixel 1300 that can be used in array 630 according to yet another embodiment of the invention. Pixel 1300 is similar to pixel 1000 (FIG. 10) in that it has a fixed IR-absorbing plate 1310a and a movable IR-absorbing plate 1310b. However, unlike plates 1010a-b of pixel 1000, which have approximately equal areas, plates 1310a-b of pixel 1300 have areas that differ by a relatively large factor. For example, in various embodiments of pixel 1300, the area of plate 1310b can be greater than the area of plate 1310b by a factor of about 2, about 10, or about 50. One reason for this area difference is that, although fixed plate 1310a absorbs IR radiation, it does not convert the absorbed radiation into mechanical displacement. In contrast, movable plate 1310b does convert the absorbed IR radiation into mechanical displacement. To increase the sensitivity of pixel 1300 to IR radiation, it is therefore advantageous to harvest most of the IR radiation impinging upon the pixel with movable plate 1310b.

Fixed plate 1310a is rigidly suspended over a substrate 1302 by being attached to an anchor 1304a (partially hidden from view in FIG. 13). Movable plate 1310b is movably suspended over substrate 1302 using anchors 1304a-b, four bi-material transducers 1308, and two thermal isolators 1306 that form two suspension arms 1322 for the movable plate. Similar to suspension arms 1022 of pixel 1000 (FIG. 10), suspension arms 1322 of pixel 1300 compensate for ambient temperature variations.

Although plates 1310a-b have the IR-absorbing areas that differ in size, these plates have visible-light reflecting areas that have substantially the same size. This characteristic is achieved by mounting on each of plates 1310a-b a respective reflector 1316 (shown semitransparent in FIG. 13 for clarity) that is adapted to reflect the interrogating light. More specifically, reflector 1316a is mounted on fixed plate 1310a using a support post 1314a attached to the fixed plate. Note that the area of reflector 1316a is greater than the area of fixed plate 1310a, and reflector 1316a overhangs a portion of movable plate 1310b. Similarly, reflector 1316b is mounted on movable plate 1310b using a support post 1314b attached to the movable plate. The area of reflector 1316b is smaller than the area of movable plate 1310b. In one embodiment, one or both of reflectors 1316a-b may overhang at least part of at least one of suspension arms 1322 to increase the relative fill factor of the reflectors.

Figure 14:
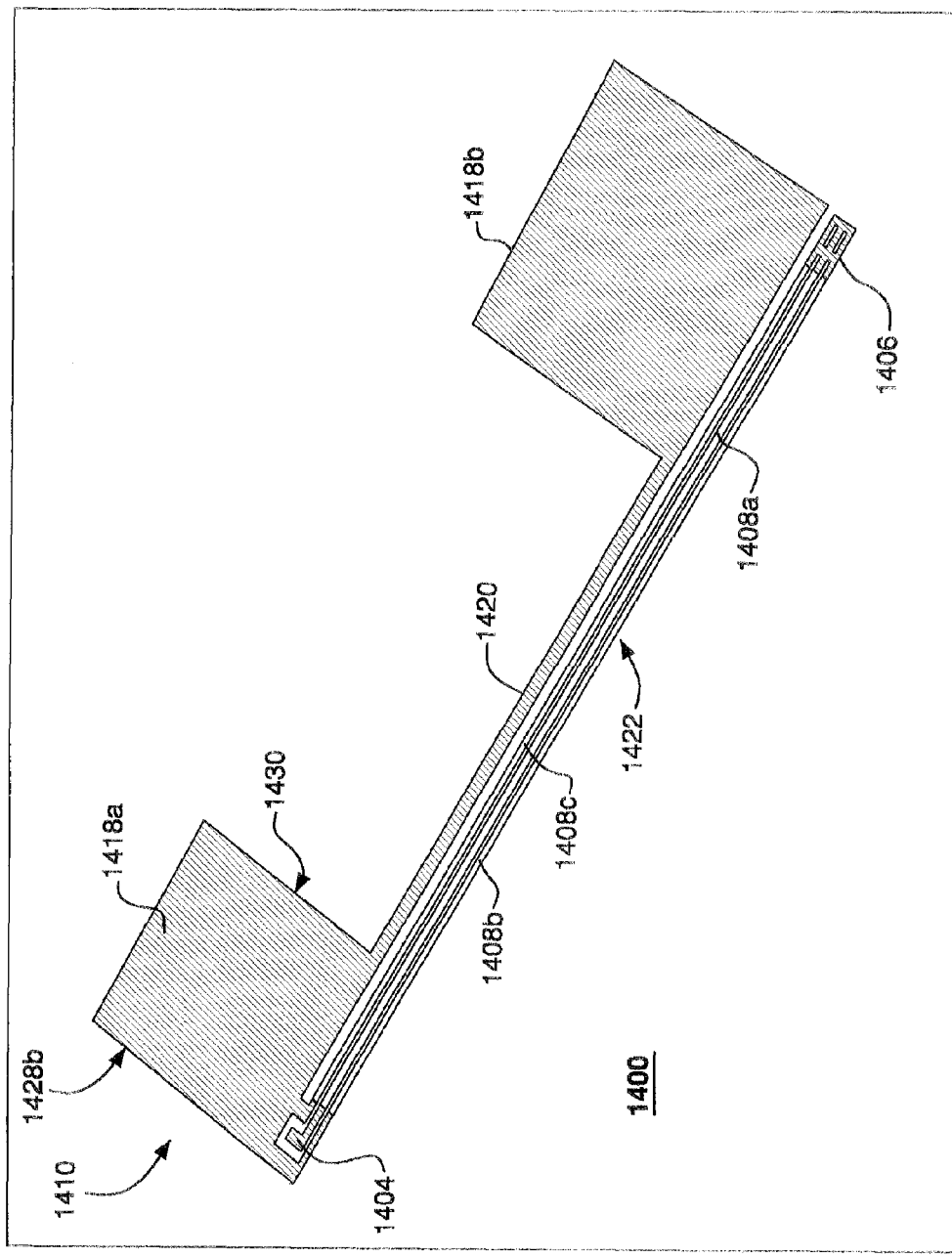
FIG. 14 shows a top view of a pixel that can be used in the IR detector array of the system shown in FIG. 6 according to yet another embodiment of the invention.

FIG. 14 shows a top view of a pixel 1400 that can be used in array 630 according to yet another embodiment of the invention. Pixel 1400 has a movable plate 1410 shaped similar to a double-bladed kayak paddle. More specifically, plate 1410 comprises two blades (plates) 1418a-b connected by a shaft 1420. Plate 1410 is suspended over the substrate using a suspension arm 1422 formed by an anchor 1404, three bi-material transducers 1408a-c, and a thermal isolator 1406. One end of bi-material transducer 1408a is attached to anchor 1404, and the other end of that bi-material transducer is attached to isolator 1406. Each of bi-material transducers 1408b-c is attached between plate 1418a and isolator 1406.

Due to the presence of isolator 1406, the IR radiation absorbed by plate 1410 causes a temperature increase in the plate and transducers 1408b-c relative to the substrate. If the material having the larger thermal-expansion coefficient is physically on top of the material having the smaller thermal-expansion coefficient, then the temperature increase causes transducers 1408b-c to curl down and deflect plate 1418a toward the substrate. In addition to the deflection, plate 1418a also becomes tilted with respect to the substrate because of the curled shape (in the "hot" state) of transducers 1408b-c. This tilt is such that an edge 1428 of plate 1418a is closer to the substrate than an opposite edge 1430 of that plate. The tilting of plate 1418a pivots shaft 1420, which tilts and moves plate 1418b away from the substrate. Thus, due to IR-induced heating, plates 1418a-b move in opposite directions, one toward the substrate and the other away from the substrate. This response of plate 1410 increases the magnitude of differential displacement of plates 1418a-b per unit IR energy, e.g., compared to that of plates 1218a-b (FIG. 12). This enhanced differential displacement can advantageously be used to achieve for pixel 1400 a relatively high sensitivity to IR radiation.

Figure 15:
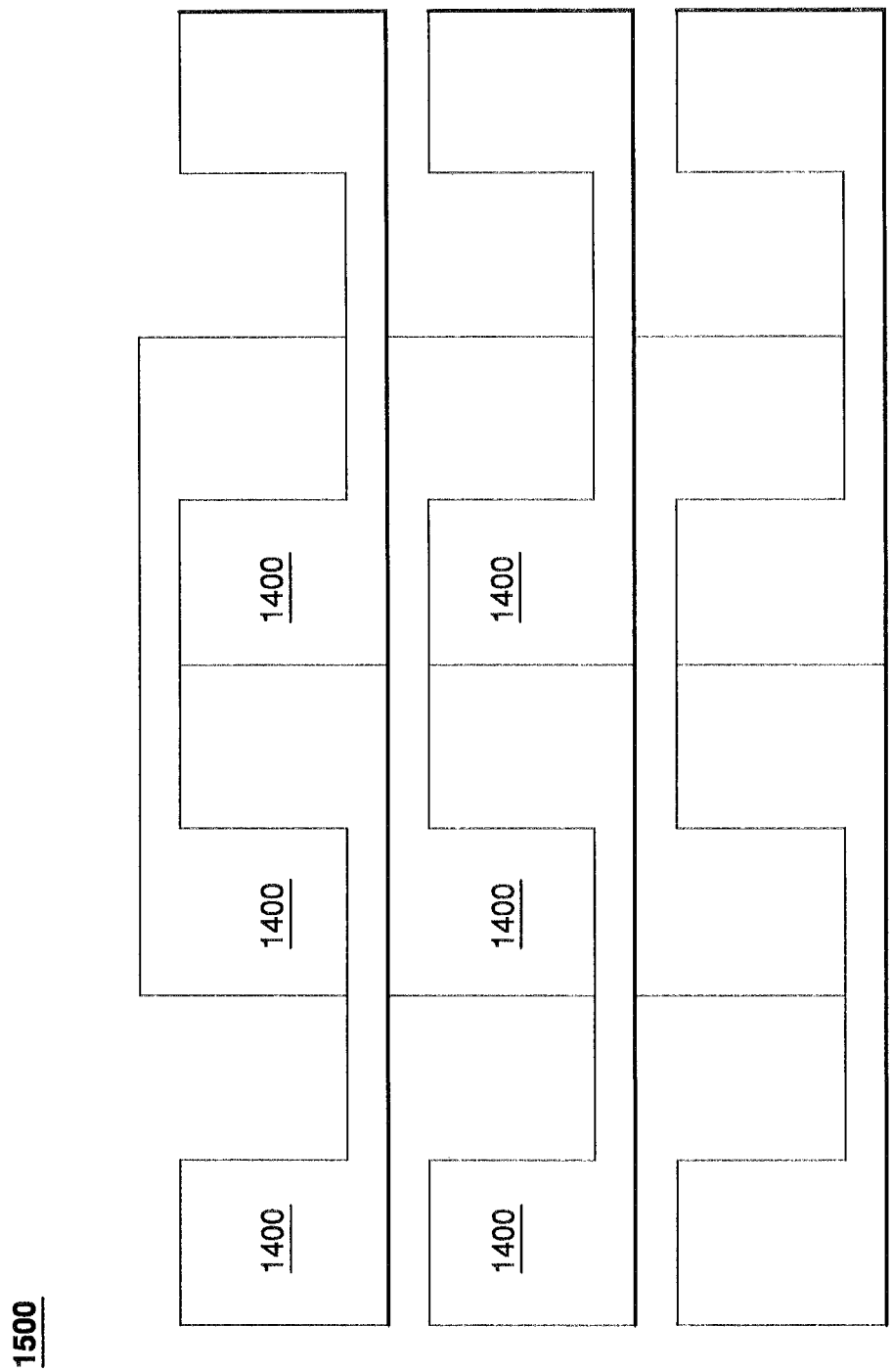
FIG. 15 shows a top view of an array that has a plurality of pixels shown in FIG. 14 according to one embodiment of the invention.

FIG. 15 shows a top view of an array 1500 that has a plurality of pixels 1400 according to one embodiment of the invention. In particular, FIG. 15 shows one representative way of arranging pixels 1400 to continuously fill a plane. One skilled in the art will appreciate that other arrangements of pixels 1400 can also be used to continuously fill a plane.

Figure 16:
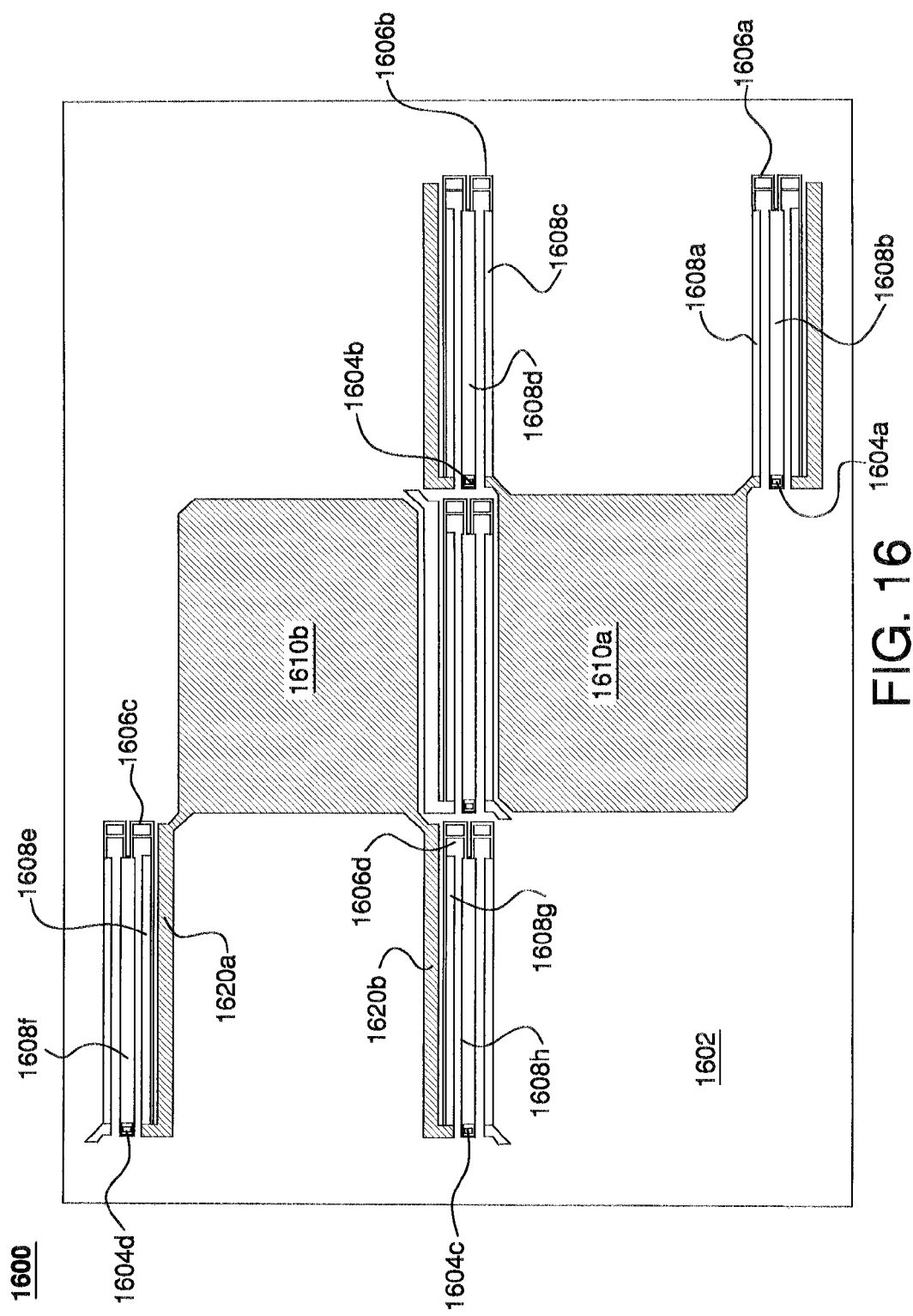
FIG. 16 shows a three-dimensional perspective view of a pixel that can be used in the IR detector array of the system shown in FIG. 6 according to yet another embodiment of the invention.

FIG. 16 shows a top view of a pixel 1600 that can be used in array 630 according to yet another embodiment of the invention. Pixel 1600 has two IR-absorbing plates 1610a-b. Plate 1610a is suspended over a substrate 1602 using two anchors 1604a-b, four bi-material transducers 1608a-d, and two thermal isolators 1606a-b that form two suspension arms for that plate. Plate 1610b is similarly suspended over substrate 1602 using two anchors 1604c-d, four bi-material transducers 1608e-h, and two thermal isolators 1606c-d that also form two suspension arm. However, one difference between plates 1610a-b is that plate 1610b is attached to its suspension arms via two respective shafts 1620a-b. Similar to shaft 1420 in pixel 1400, shaft 1620 in pixel 1600 causes plate 1610b to move in the opposite direction than that of plate 1610a. More specifically, if the layer structure of bi-material transducers 1608 is such that, upon heating, plate 1610a moves toward substrate 1602, then, upon similar heating, plate 1610b moves away from the substrate. This response of plates 1610a-b makes the magnitude of their differential displacement per unit IR energy to be relatively high, which advantageously translates into relatively high sensitivity to IR radiation for pixel 1600.

Figure 17A:
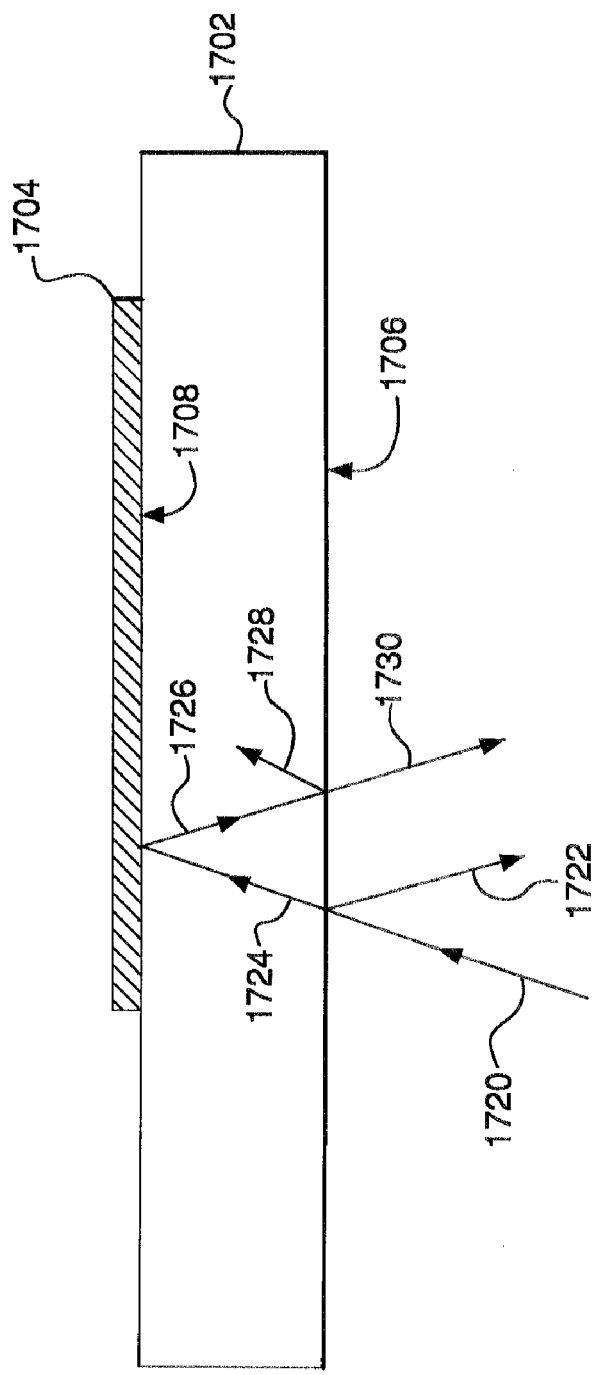
FIGS. 17A-B show cross-sectional views of a plate that can be used in the IR detector array of the system shown in FIG. 6 according to further embodiments of the invention.
Figure 17B:
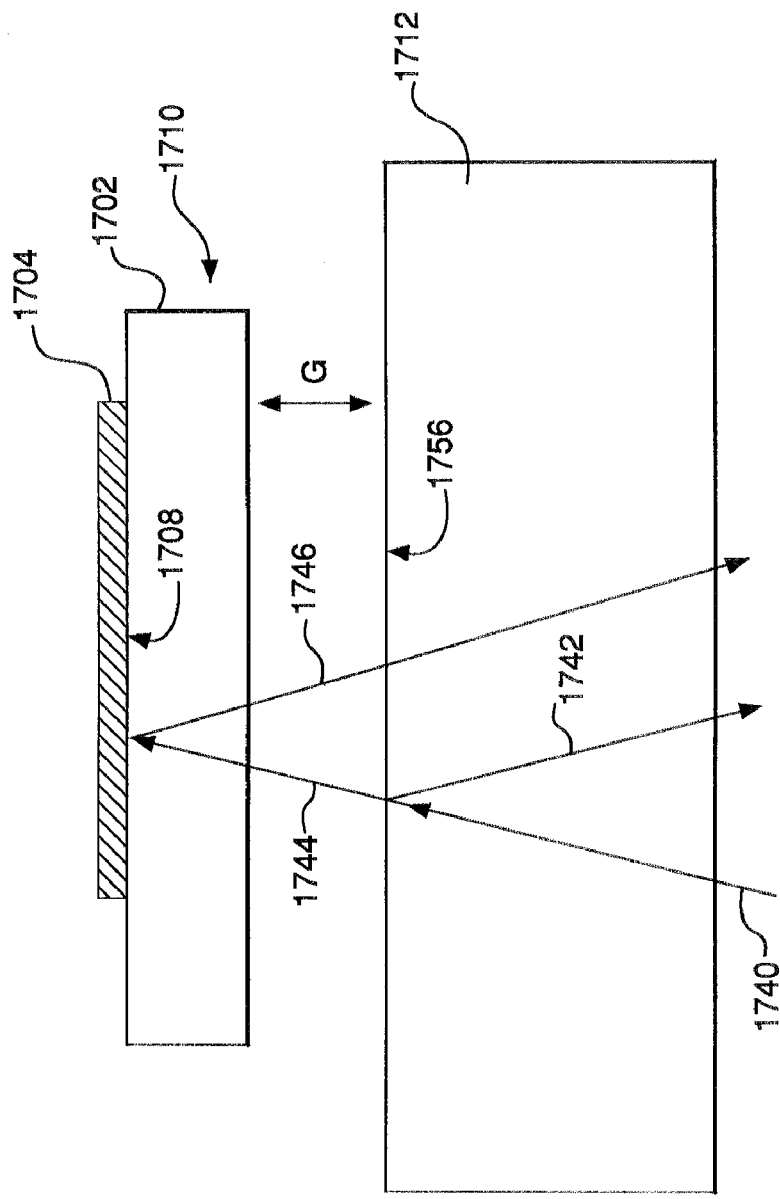

FIGS. 17A-B show cross-sectional views of a plate 1710 that can be used as plate 1610 according to further embodiments of the invention. Plate 1710 has a base layer 1702, which itself can contain several sub-layers. One function of base layer 1702 is to provide mechanical support for a relatively thin metal layer 1704, the exterior side of which can be used as a reflecting region for the interrogating light (see, e.g., FIG. 2). Another function of base layer 1702 is to serve as an IR-absorbing region for plate 1710.

In one embodiment illustrated by FIG. 17A, the thickness of base layer 1702 is chosen so as to create a resonator for the IR radiation. More specifically, an IR beam 1720 (for illustration purposes shown as propagating at angle to the normal of plate 1710) impinging upon an air/dielectric interface 1706 is partially reflected from that interface as beam 1722 and partially transmitted as beam 1724. Beam 1724 is then reflected form a metal/dielectric interface 1708 as beam 1726. Beam 1726 is then partially reflected from interface 1706 as beam 1728 and partially transmitted as beam 1730. If the thickness of base layer 1702 is chosen so that beams 1722 and 1730 interfere destructively, then the IR beam becomes substantially trapped between interfaces 1706 and 1708, while making multiple trips through the base layer. Because base layer 1702 absorbs a fraction of the IR radiation during each pass, the cumulative IR absorption in the base layer can be made relatively large, e.g., about 60%, which advantageously increases the sensitivity of the corresponding IR detector.

In another embodiment illustrated by FIG. 17B, the thickness of base layer 1702 and the thickness of air gap G between the base layer and a substrate 1712 are chosen so as to create a resonator for the IR radiation. More specifically, an IR beam 1740 (for illustration purposes shown as propagating at angle to the normal of plate 1710) impinging upon a substrate/air interface 1756 is partially reflected from that interface as beam 1742 and partially transmitted as beam 1744. Beam 1744 is then reflected form interface 1708 as beam 1746. If the cumulative thickness of base layer 1702 and the air gap is chosen so that beams 1742 and 1746 interfere destructively, then the IR beam becomes substantially trapped between interfaces 1708 and 1756, while making multiple trips through the base layer, which increases the amount of absorbed IR radiation.

Figure 18A:
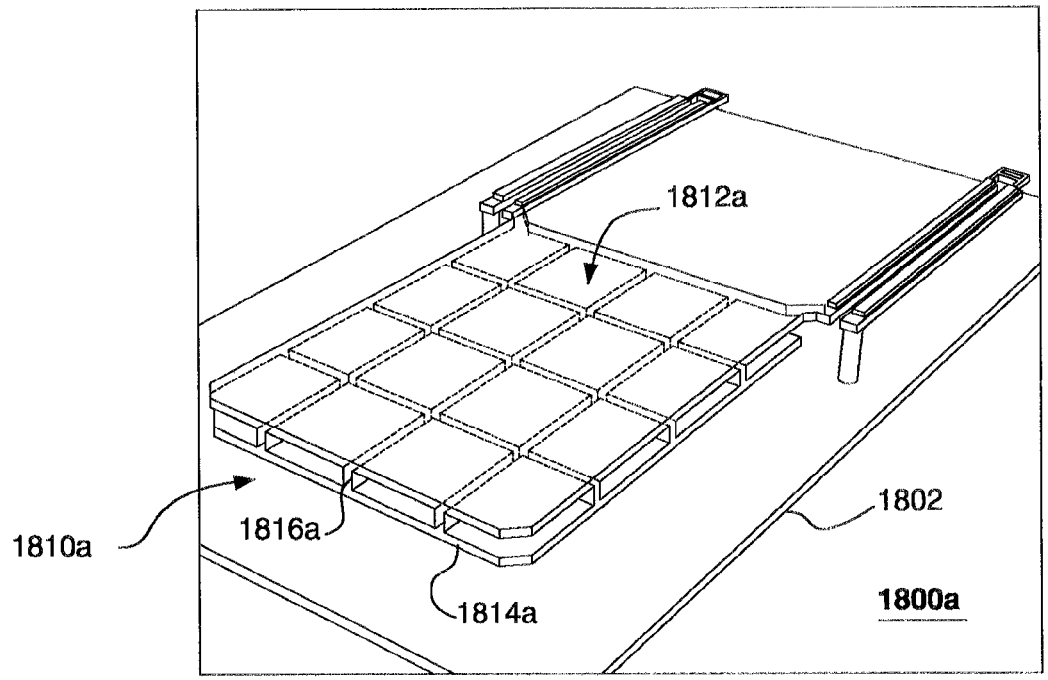
FIGS. 18A-B show three-dimensional perspective views of two respective detectors that can be used in the pixel shown in FIG. 16 according to another embodiment of the invention.
Figure 18B:
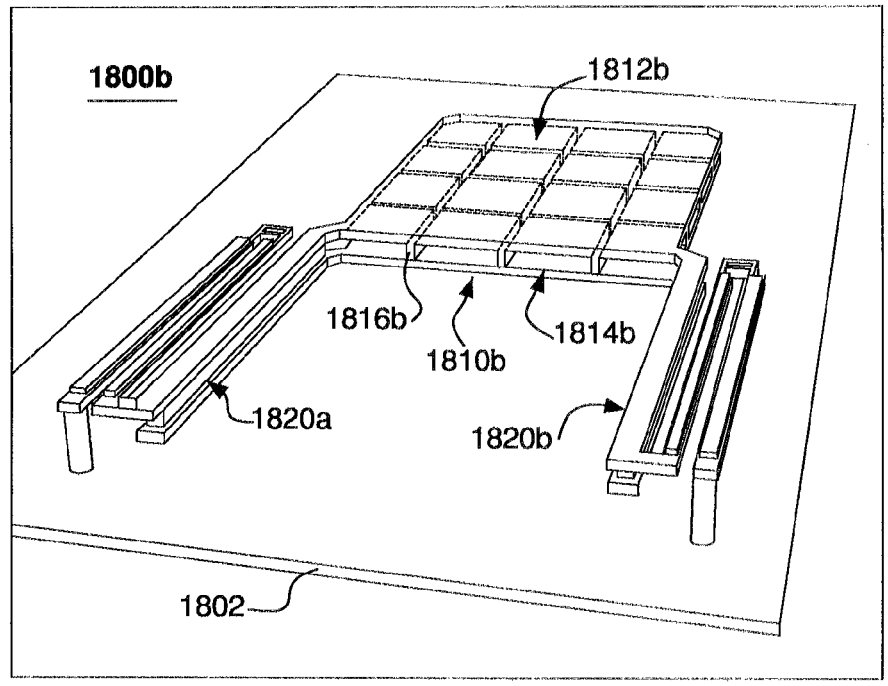

FIGS. 18A-B show three-dimensional perspective views of two respective detectors 1800a-b that can be used in pixel 1600 according to another embodiment of the invention. More specifically, detector 1800a can be used in place of the detector having plate 1610a, and detector 1800b can be used in place of the detector having plate 1610b. To form a pixel, detectors 1800a-b can be positioned so that plates 1810a-b of those detectors are oriented with respect to each other similar to plates 1610a-b in pixel 1600.

Each plate 1810 has two respective layers 1812 and 1814 separated by a mesh-like structure 1816. The extra layer (i.e., layer 1814) in plate 1810 can be used to improve IR absorption as follows. The materials of and the separation between layer 1812 and substrate 1802 can be chosen, as known in the art, to create a resonator for the IR light. More specifically, a metal layer similar to layer 1704 (see FIGS. 17A-B) can be deposited over layer 1812 and the distance between layer 1812 and substrate 1802 be chosen so that an IR beam becomes substantially trapped between them, e.g., as illustrated in FIG. 17B. The intensity distribution of the trapped IR light is not uniform, but rather, has peaks and valleys similar to those of a standing wave. If the height of structure 1816 is such that layer 1814 is placed at a peak of the intensity distribution, then layer 1814 can absorb IR radiation very effectively, thereby increasing the overall IR absorption in plate 1810.

Structure 1816 is designed so that, in addition to placing layer 1814 at the prescribed location, it provides good thermal contact between layers 1812 and 1814. Similarly, shafts 1820a-b that are analogous to shafts 1620a-b (FIG. 16) have a bi-layer structure to provide good thermal contact between plate 1810b and bi-material transducers of the respective suspension arms. Alternative designs for shafts 1820a-b include increasing the width of the shafts compared to those shown in FIG. 18 and/or using materials having relatively high heat conductance to provide good heat flow to the transducers.

Figure 19:
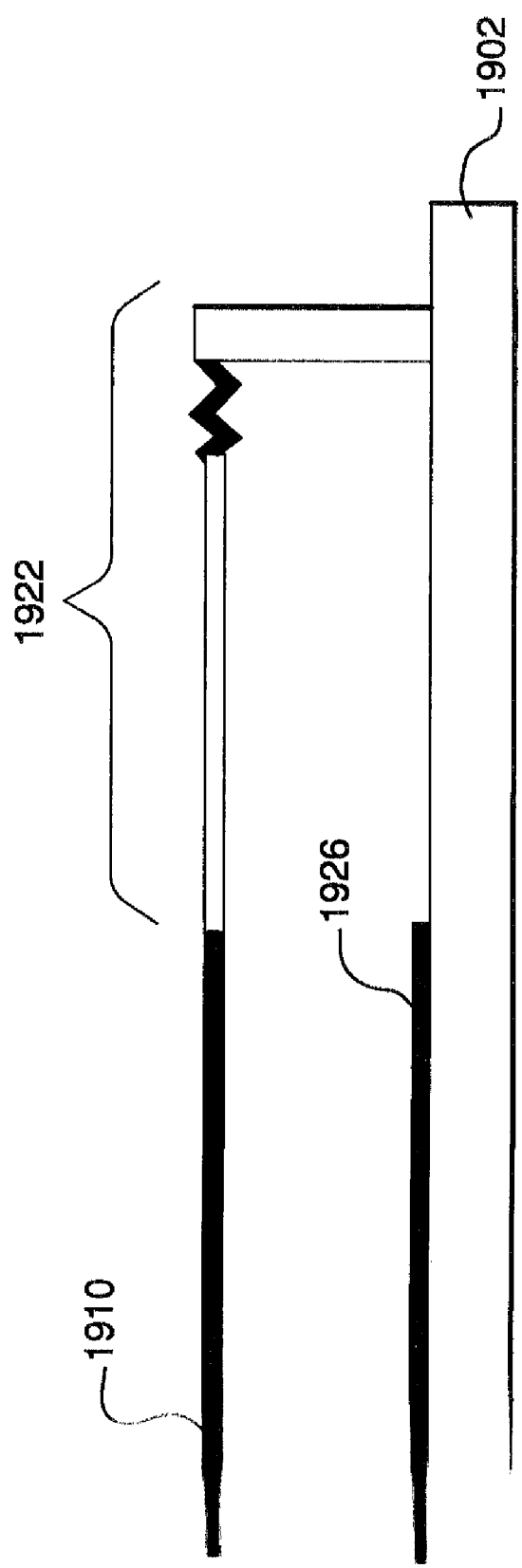
FIG. 19 shows a side cross-sectional view of an IR detector according to another embodiment of the invention.

FIG. 19 shows a side cross-sectional view of a detector 1900 according to another embodiment of the invention. Detector 1900 is generally analogous to, e.g., detector 1800, except that detector 1900 is designed for electrical readout. More specifically, (1) a movable plate 1910 that is supported on a substrate 1902 by a suspension arm 1922 and (2) an electrode 1926 deposited on the substrate form a capacitor that can be used, as known in the art, to implement electrical sensing of the plate's position. A representative description of such electrical sensing can be found, e.g., in the above-cited article by S. R. Hunter, R. A. Amantea, L. A. Goodman, et al.

Although many detectors, pixels, and arrays of the invention have been described in reference to optical sensing of plate displacements, in certain embodiments, they can be adapted for electrical readout. For example, pixels 800, 1000, 1100, 1200, 1400, and 1600 can include electrodes deposited on the substrate under the respective plates to form capacitors that are similar to the capacitor formed by plate 1910 and electrode 1926.

Detectors, pixels, arrays, and MEMS devices of the invention can be fabricated, e.g., as described in commonly owned U.S. Pat. Nos. 6,850,354 and 6,924,581 using layered wafers, the teachings of which patents are incorporated herein by reference. Additional layers of material may be deposited onto a wafer using, e.g., chemical vapor deposition. Various parts of the devices may be mapped onto the corresponding layers using lithography. Additional description of various fabrication steps may be found, e.g., in U.S. Pat. Nos. 6,201,631, 5,629,790, and 5,501,893, the teachings of all of which are incorporated herein by reference. Representative fabrication-process flows can be found, e.g., in U.S. Pat. Nos. 6,667,823, 6,876,484, 6,980,339, 6,995,895, and 7,099,063 and U.S. patent application Ser. No. 11/095,071 (filed on Mar. 31, 2005), the teachings of all of which are incorporated herein by reference.

As used in this specification, the term infrared radiation covers all of the following spectral bands: (1) visible to near IR, wavelengths from about 400 nm to about 1 μm; (2) short-wave IR, wavelengths from about 1 μm to about 3 μm; (3) midwave IR, wavelengths from about 3 μm to about 7 μm; and (4) long-wave IR, wavelengths from about 7 μm to about 14 μm.

While this invention has been described with reference to illustrative embodiments, this description is not intended to be construed in a limiting sense. Various surfaces may be modified, e.g., by metal deposition for enhanced reflectivity, IR absorption, and/or electrical conductivity, or by ion implantation for enhanced mechanical strength. Differently shaped paddles, arms, anchors, plates, shafts, posts, beams, and/or electrodes may be implemented without departing from the scope and principle of the invention. Detectors of the invention can be variously arrayed to form linear or two-dimensional arrays. Devices and systems of the invention can be configured to operate with CW or pulsed light. Interrogating light can be of any suitable wavelength, e.g., from the near-infrared region, and not necessarily limited to the visible spectrum. Devices of the invention can be formed using one, two or more wafers secured together. Although detectors of the invention have been described in reference to IR radiation, they can similarly be configured to detect other radiation types, e.g., visible light, terahertz radiation, or corpuscular radiation. Various modifications of the described embodiments, as well as other embodiments of the invention, which are apparent to persons skilled in the art to which the invention pertains are deemed to lie within the principle and scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. Similarly, while many figures show the different structural layers as horizontal layers, such orientation is for descriptive purpose only and not to be construed as a limitation.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, Microsystems, and devices produced using Microsystems technology or Microsystems integration.

Although the present invention has been described in the context of implementation as MEMS devices, the present invention can in theory be implemented at any scale, including scales larger than micro-scale.

What is claimed is:

1. A device, comprising:
   a substrate;
   a first plate; and
   a first suspension arm that supports the first plate at an offset distance from the substrate, wherein the first suspension arm comprises:
   an anchor attached to the substrate; and
   first, second, and third rods, wherein:
   each of the first, second, and third rods is a bimorph transducer;
   a first end of the first rod is attached to the anchor;

a first end of the second rod is attached to the first plate;
a first end of the third rod is attached to the first plate;
second ends of the first, second, and third rods are connected to one another by a thermal isolator; and
in response to a temperature difference between the first rod and at least one of the second and third rods, the first suspension arm is adapted to deform and change the offset distance for the first plate.

2. The invention of claim 1, wherein each of the first, second, and third rods is oriented substantially parallel to the substrate and to each of the remaining two rods.

3. The invention of claim 1, wherein:
the first rod is located between the second and third rods.

4. The invention of claim 1, further comprising:
a second plate; and
a shaft connected between the first and second plates and adapted to support the second plate at a respective offset distance from the substrate, wherein:
if, in response to the temperature difference, the first suspension arm changes the offset distance for the first plate, then:
the shaft causes a change in the offset distance for the second plate, and
the first and second plates are displaced in opposite directions.

5. The invention of claim 1, wherein:
the substrate is substantially transparent to visible light; and
the first plate has a reflective layer that is adapted to be illuminated through the substrate and direct the reflected light back through the substrate.

6. The invention of claim 1, wherein:
the substrate is substantially transparent to infrared (IR) radiation; and
the first plate has an IR-absorbing layer that is adapted to be illuminated the IR radiation through the substrate.

7. The invention of claim 1, wherein the first plate comprises:
a base layer;
a reflective layer adjacent to the base layer and adapted to reflect visible light.

8. The invention of claim 1, wherein the first plate comprises:
a first layer;
a mesh-like structure attached to the first layer; and
a second layer attached to said structure.

9. The invention of claim 8, wherein:
the first layer and the substrate form a resonator for radiation; and
the second layer is positioned inside the resonator at a position corresponding to an intensity maximum of the radiation present in the resonator.

10. The invention of claim 1, further comprising an electrode attached to the substrate, wherein the first plate and the electrode form a capacitor whose capacitance is responsive to the change in the offset distance for the first plate.

11. A device, comprising:
a substrate;
a first plate;
a first suspension arm that supports the first plate at an offset distance from the substrate;
a second plate supported at a respective offset distance from the substrate, wherein:
each of the first and second plates has a respective reflector mounted on the plate; and
the first suspension arm comprises:

an anchor attached to the substrate; and
two or more rods, wherein:
each of the two or more rods is a bimorph transducer;
a first end of a first rod is attached to the anchor;
a first end of a second rod is attached to the first plate;
second ends of the first and second rods are connected to one another by a thermal isolator; and
in response to a temperature difference between the first and second rods, the first suspension arm is adapted to deform and change the offset distance for the first plate; and
a second suspension arm that supports the second plate at the respective offset distance from the substrate, wherein the first and second arms share at least one rod.

12. The invention of claim 11, wherein the second suspension arm comprises:
the anchor;
the first rod; and
a third rod, wherein:
a first end of the third rod is connected to the second plate;
a second end of the third rod is connected to the second end of the first rod; and
in response to a temperature difference between the first and third rods, the second suspension arm is adapted to deform and change the offset distance for the second plate.

13. The invention of claim 12, wherein:
the second end of the third rod is connected to the second end of the first rod by a thermal link that is adapted to keep the third rod and the second plate in substantial thermal equilibrium with the first rod.

14. The invention of claim 11, wherein:
the second suspension arm further comprises a shaft connected between the first end of the third rod and the second plate; and
the second end of the third rod is connected to the second end of the first rod by the thermal isolator.

15. The invention of claim 11, wherein, in response to a temperature increase of the first and second plates with respect to the temperature of the substrate:
the first suspension arm is adapted to decrease the offset distance for the first plate; and
the second suspension arm is adapted to increase the offset distance for the second plate.

16. The invention of claim 11, wherein:
the reflector mounted on the second plate overhangs the first plate.

17. The invention of claim 11, wherein:
each of the first and second plates is supported on the substrate by one or more respective suspension arms; and
at least one of the reflectors overhangs at least a portion of at least one suspension arm.

18. The invention of claim 11, wherein:
at least one of the reflectors overhangs at least a portion of the plate on which a different reflector is mounted, wherein said at least one reflector and said different reflector are mounted on different plates.

19. The invention of claim 11, further comprising an electrode attached to the substrate, wherein the first plate and the electrode form a capacitor whose capacitance is responsive to the change in the offset distance for the first plate.

20. A device, comprising:
a substrate;

a first plate;
a first suspension arm that supports the first plate at an offset distance from the substrate; and
a second plate supported at a respective offset distance from the substrate, wherein:
  each of the first and second plates has a respective reflector mounted on the plate;
  the first suspension arm comprises:
    an anchor attached to the substrate; and
    two or more rods, wherein:
      each of the two or more rods is a bimorph transducer;
      a first end of a first rod is attached to the anchor;
      a first end of a second rod is attached to the first plate;
      second ends of the first and second rods are connected to one another by a thermal isolator; and
      in response to a temperature difference between the first and second rods, the first suspension arm is adapted to deform and change the offset distance for the first plate; and
  the reflector mounted on the second plate overhangs the first plate.

21. A device, comprising:
a substrate;
a first plate;
a first suspension arm that supports the first plate at an offset distance from the substrate; and
a second plate supported at a respective offset distance from the substrate, wherein:
  each of the first and second plates has a respective reflector mounted on the plate;
  the first suspension arm comprises:
    an anchor attached to the substrate; and
    two or more rods, wherein:
      each of the two or more rods is a bimorph transducer;
      a first end of a first rod is attached to the anchor;
      a first end of a second rod is attached to the first plate;
      second ends of the first and second rods are connected to one another by a thermal isolator; and
      in response to a temperature difference between the first and second rods, the first suspension arm is adapted to deform and change the offset distance for the first plate;
  each of the first and second plates is supported on the substrate by one or more respective suspension arms; and
  at least one of the reflectors overhangs at least a portion of at least one suspension arm.

22. A device, comprising:
a substrate;
a first plate;
a first suspension arm that supports the first plate at an offset distance from the substrate; and
a second plate supported at a respective offset distance from the substrate, wherein:
  each of the first and second plates has a respective reflector mounted on the plate;
  the first suspension arm comprises:
    an anchor attached to the substrate; and
    two or more rods, wherein:
      each of the two or more rods is a bimorph transducer;
      a first end of a first rod is attached to the anchor;
      a first end of a second rod is attached to the first plate;
      second ends of the first and second rods are connected to one another by a thermal isolator; and
      in response to a temperature difference between the first and second rods, the first suspension arm is adapted to deform and change the offset distance for the first plate; and
  at least one of the reflectors overhangs at least a portion of the plate on which a different reflector is mounted, wherein said at least one reflector and said different reflector are mounted on different plates.

* * * * *